(12) United States Patent
Manome

(10) Patent No.: US 11,865,710 B2
(45) Date of Patent: Jan. 9, 2024

(54) VERTICAL ARTICULATED ROBOT, SINGLE-AXIS ROBOT, AND MOTOR UNIT

(71) Applicant: YAMAHA HATSUDOKI KABUSHIKI KAISHA, Iwata (JP)

(72) Inventor: Toshifumi Manome, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/761,811

(22) PCT Filed: Sep. 25, 2019

(86) PCT No.: PCT/JP2019/037653
§ 371 (c)(1),
(2) Date: Mar. 18, 2022

(87) PCT Pub. No.: WO2021/059403
PCT Pub. Date: Apr. 1, 2021

(65) Prior Publication Data
US 2022/0388152 A1 Dec. 8, 2022

(51) Int. Cl.
*B25J 9/06* (2006.01)
*B25J 9/00* (2006.01)
*B25J 17/02* (2006.01)
*F16J 15/40* (2006.01)
*F16H 49/00* (2006.01)
*B25J 9/10* (2006.01)
*B25J 9/12* (2006.01)

(52) U.S. Cl.
CPC ........... *B25J 9/0009* (2013.01); *B25J 9/1025* (2013.01); *B25J 17/02* (2013.01); *F16H 49/001* (2013.01); *F16J 15/40* (2013.01); *B25J 9/126* (2013.01)

(58) Field of Classification Search
CPC ........ B25J 9/0009; B25J 9/1025; B25J 17/02; B25J 19/0004; F16H 49/001; F16J 15/40
USPC .......................................................... 310/77
See application file for complete search history.

(56) References Cited

U.S. PATENT DOCUMENTS

| | | | | |
|---|---|---|---|---|
| 10,099,367 | B2* | 10/2018 | Hirabayashi | ............... B25J 9/12 |
| 2017/0237315 | A1* | 8/2017 | Hirokawa | ............... H02K 41/06 |
| | | | | 310/77 |

FOREIGN PATENT DOCUMENTS

| CN | 104552289 A | 4/2015 |
|---|---|---|
| CN | 107685341 A | 2/2018 |
| CN | 109693225 A | 4/2019 |
| EP | 0146783 A2 | 7/1985 |
| JP | S63-17790 U | 2/1988 |
| JP | S63-086454 U1 | 6/1988 |

(Continued)

OTHER PUBLICATIONS

An Office Action; "Notice of Reasons for Refusal," mailed by the Japanese Patent Office dated Aug. 23, 2022, which corresponds to Japanese Patent Application No. 2021-548051 and is related to U.S. Appl. No. 17/761,811; with English language translation.

(Continued)

*Primary Examiner* — William C Joyce
(74) *Attorney, Agent, or Firm* — Studebaker & Brackett PC

(57) ABSTRACT

A vertical articulated robot includes a plurality of joint axis portions configured to rotationally drive a plurality of arms. The plurality of joint axis portions include a narrow joint axis portion. In the narrow joint axis portion, at least one of at least a portion of a brake or an oil seal is arranged inside a recess.

9 Claims, 18 Drawing Sheets

(56) References Cited

FOREIGN PATENT DOCUMENTS

| | | |
|---|---|---|
| JP | H04-061460 U1 | 5/1992 |
| JP | H11-254377 A | 9/1999 |
| JP | 2001-113488 A | 4/2001 |
| JP | 2002-239970 A | 8/2002 |
| JP | 2006-026748 A | 2/2006 |
| JP | 2011-245586 A | 12/2011 |
| JP | 5003369 B2 | 8/2012 |
| JP | 2012-192497 A | 10/2012 |
| JP | 5257263 B2 | 8/2013 |
| WO | 2018/055752 A1 | 3/2018 |

OTHER PUBLICATIONS

International Search Report issued in PCT/JP2019/037653; dated Dec. 10, 2019.
Written Opinion issued in PCT/JP2019/037653; dated Dec. 10, 2019.
An Office Action mailed by China National Intellectual Property Administration dated Aug. 10, 2023, which corresponds to Chinese Patent Application No. 201980100503.7 and is related to U.S. Appl. No. 17/761,811.

* cited by examiner (FIRST EMBODIMENT)

(FIRST EMBODIMENT)

(FIRST EMBODIMENT)

FIFTH JOINT AXIS PORTION (SECOND EMBODIMENT)

MOTOR UNIT OF SECOND JOINT AXIS PORTION (SECOND EMBODIMENT)

SECOND JOINT AXIS PORTION (SECOND EMBODIMENT)

MOTOR UNIT OF THIRD JOINT AXIS PORTION (SECOND EMBODIMENT)

THIRD JOINT AXIS PORTION (SECOND EMBODIMENT)

FIFTH AND SIXTH JOINT AXIS PORTION UNIT (SECOND EMBODIMENT)

FIFTH AND SIXTH JOINT AXIS PORTION (SECOND EMBODIMENT)

(THIRD EMBODIMENT)

SECOND JOINT AXIS PORTION (THIRD EMBODIMENT)

(FOURTH EMBODIMENT)

MOTOR UNIT OF SECOND JOINT AXIS PORTION (FOURTH EMBODIMENT)

SECOND JOINT AXIS PORTION (FOURTH EMBODIMENT)

MOTOR UNIT OF THIRD JOINT AXIS PORTION (FOURTH EMBODIMENT)

THIRD JOINT AXIS PORTION (FIFTH EMBODIMENT)

VERTICAL ARTICULATED ROBOT, SINGLE-AXIS ROBOT, AND MOTOR UNIT

CROSS-REFERENCE TO RELATED APPLICATION

This application is a National Stage of International Patent Application No. PCT/JP2019/037653, filed Sep. 25, 2019, the entire content of which is incorporated herein by reference.

BACKGROUND

Technical Field

The present disclosure relates to a vertical articulated robot, a single-axis robot, and a motor unit, and more particularly, it relates to a vertical articulated robot, a single-axis robot, and a motor unit each including a motor and a speed reducer.

Background Art

Conventionally, a vertical articulated robot including a motor and a speed reducer is known. Such a vertical articulated robot is disclosed in Japanese Patent Laid-Open No. 2001-113488, for example.

Japanese Patent Laid-Open No. 2001-113488 discloses an industrial robot that is a 5-axis vertical articulated robot. In a second axis and a third axis of this industrial robot, a motor and a speed reducer unit are connected to each other via a timing belt.

SUMMARY

However, in the industrial robot disclosed in Japanese Patent Laid-Open No. 2001-113488, the motor and the speed reducer unit are connected to each other via the timing belt, and thus when the timing belt is stretched, the positioning accuracy is disadvantageously decreased due to the stretching of the timing belt. In order to prevent the timing belt from stretching, it is conceivable that the motor and the speed reducer unit are directly connected to each other without using the timing belt. However, when the motor and the speed reducer unit are directly connected to each other, the size of a joint axis portion including the motor and the speed reducer unit is increased in an axial direction, and thus it is difficult to downsize the joint axis portion in the axial direction.

Accordingly, the present disclosure provides a vertical articulated robot, a single-axis robot, and a motor unit each capable of being downsized in an axial direction even when a motor and a speed reducer are directly connected to each other.

A vertical articulated robot according to a first aspect of the present disclosure includes a plurality of arms, and a plurality of joint axis portions configured to rotationally drive the plurality of arms. The plurality of joint axis portions include a narrow joint axis portion. The narrow joint axis portion includes a motor including a motor shaft, a speed reducer directly connected to the motor shaft, a brake configured to hold the motor, and an oil seal mounted on the motor shaft. The speed reducer of the narrow joint axis portion includes a recess defined by at least a shaft input and a bearing and recessed along a rotation axis direction. In the narrow joint axis portion, at least one of at least a portion of the brake or the oil seal is arranged inside the recess.

In the vertical articulated robot according to the first aspect of the present disclosure, as described above, the speed reducer of the narrow joint axis portion includes the recess that is recessed along the rotation axis direction, and at least one of at least the portion of the brake or the oil seal is arranged inside the recess. Thus, at least one of at least the portion of the brake or the oil seal can be arranged using a space inside the recess of the speed reducer. Therefore, it is possible to provide the vertical articulated robot capable of downsizing the joint axis portion in the axial direction even when the motor and the speed reducer are directly connected to each other.

In the aforementioned vertical articulated robot according to the first aspect, the narrow joint axis portion preferably includes a joint axis portion configured to rotationally drive the arm around a rotation axis extending along a width direction orthogonal to a direction in which the arm extends. Accordingly, the arm can be downsized in the width direction (axial direction) orthogonal to the direction in which the arm extends by a decrease in the size of the joint axis portion in the axial direction. Thus, due to a decrease in the size of the arm in the width direction orthogonal to the direction in which the arm extends, the vertical articulated robot can enter a narrower space. Consequently, the degree of freedom for the work of the vertical articulated robot can be improved.

In this case, the narrow joint axis portion preferably includes a wrist structure joint axis portion provided on a distal side. Accordingly, the arm corresponding to the wrist structure can be downsized in the width direction (axial direction) orthogonal to the direction in which the arm extends by a decrease in the size of the joint axis portion in the axial direction. Thus, due to a decrease in the size of the arm corresponding to the wrist structure in the width direction orthogonal to the direction in which the arm extends, the vertical articulated robot can more easily enter a narrower space. Consequently, the degree of freedom for the work of the vertical articulated robot can be further improved.

In the aforementioned vertical articulated robot according to the first aspect, the speed reducer preferably includes a wave gear speed reducer, the wave gear speed reducer preferably includes a wave generator as the shaft input, a circular spline, and a flexspline, and the at least one of at least the portion of the brake or the oil seal is preferably arranged inside the recess defined by at least the wave generator, the circular spline, the flexspline, and the bearing. Accordingly, the at least one of at least the portion of the brake or the oil seal can be arranged using the space inside the recess defined by the wave generator, the circular spline, the flexspline, and the bearing of the wave gear speed reducer, which is the wave gear speed reducer, and thus the joint axis portion can be easily downsized in the axial direction.

In the aforementioned vertical articulated robot according to the first aspect, the recess is preferably provided on the motor side, and the at least one of at least the portion of the brake or the oil seal is preferably arranged inside the recess. Accordingly, the joint axis portion can be downsized in the axial direction while at least one of the brake or the oil seal is arranged on the motor side.

In the aforementioned vertical articulated robot according to the first aspect, the recess is preferably provided on a side opposite to the motor side, and the at least one of at least the portion of the brake or the oil seal is preferably arranged inside the recess. Accordingly, the joint axis portion can be downsized in the axial direction while at least one of the brake or the oil seal is arranged on the side opposite to the motor side.

In the aforementioned vertical articulated robot according to the first aspect, the narrow joint axis portion preferably includes a motor unit integrally including the motor, the speed reducer, the brake, and the oil seal. Accordingly, the motor, the speed reducer, the brake, and the oil seal can be handled integrally, and thus the motor, the speed reducer, the brake, and the oil seal can be easily assembled and replaced as compared with a case in which the motor, the speed reducer, the brake, and the oil seal cannot be handled integrally.

In the aforementioned vertical articulated robot according to the first aspect, the plurality of joint axis portions preferably include a distal joint axis portion to which a tool is attached, and the narrow joint axis portion and the distal joint axis portion are preferably configured to integrally form a distal joint axis portion unit. Accordingly, the narrow joint axis portion and the distal joint axis portion can be handled integrally, and thus the narrow joint axis portion and the distal joint axis portion can be easily assembled and replaced as compared with a case in which the narrow joint axis portion and the distal joint axis portion cannot be handled integrally.

A single-axis robot according to a second aspect of the present disclosure includes a rotation axis portion configured to rotationally drive an arm. The rotation axis portion includes a motor including a motor shaft, a speed reducer directly connected to the motor shaft, a brake configured to hold the motor, and an oil seal mounted on the motor shaft. The speed reducer includes a recess defined by at least a shaft input and a bearing and recessed along a rotation axis direction. At least one of at least a portion of the brake or the oil seal is arranged inside the recess.

The single-axis robot according to the second aspect of the present disclosure is configured as described above. Accordingly, similarly to the vertical articulated robot according to the first aspect, it is possible to provide the single-axis robot capable of downsizing the rotation axis portion in the axial direction even when the motor and the speed reducer are directly connected to each other.

A motor unit according to a third aspect of the present disclosure includes a motor including a motor shaft, a speed reducer directly connected to the motor shaft, a brake configured to hold the motor, and an oil seal mounted on the motor shaft. The speed reducer includes a recess defined by at least a shaft input and a bearing and recessed along a rotation axis direction, and at least one of at least a portion of the brake or the oil seal is arranged inside the recess.

The motor unit according to the third aspect of the present disclosure is configured as described above. Accordingly, similarly to the vertical articulated robot according to the first aspect, it is possible to provide the motor unit capable of being downsized in the axial direction even when the motor and the speed reducer are directly connected to each other.

A vertical articulated robot according to a fourth aspect of the present disclosure includes a plurality of arms, and a plurality of joint axis portions configured to rotationally drive the plurality of arms. The plurality of joint axis portions include a narrow joint axis portion. The narrow joint axis portion includes a motor including a housing and a motor shaft, a speed reducer directly connected to the motor shaft, a brake arranged outside the housing and configured to hold the motor, and an oil seal arranged outside the housing and mounted on the motor shaft. The speed reducer of the narrow joint axis portion includes a recess defined by at least a shaft input and a bearing and recessed along a rotation axis direction. In the narrow joint axis portion, at least a portion of the brake and the oil seal are arranged inside the recess outside the housing.

A single-axis robot according to a fifth aspect of the present disclosure includes a rotation axis portion configured to rotationally drive an arm. The rotation axis portion includes a motor including a housing and a motor shaft, a speed reducer directly connected to the motor shaft, a brake arranged outside the housing and configured to hold the motor, and an oil seal arranged outside the housing and mounted on the motor shaft. The speed reducer includes a recess defined by at least a shaft input and a bearing and recessed along a rotation axis direction. At least a portion of the brake and the oil seal are arranged inside the recess outside the housing.

A motor unit according to a sixth aspect of the present disclosure includes a motor including a housing and a motor shaft, a speed reducer directly connected to the motor shaft, a brake arranged outside the housing and configured to hold the motor, and an oil seal arranged outside the housing and mounted on the motor shaft. The speed reducer includes a recess defined by at least a shaft input and a bearing and recessed along a rotation axis direction. At least a portion of the brake and the oil seal are arranged inside the recess outside the housing.

According to the present disclosure, as described above, it is possible to provide the vertical articulated robot, the single-axis robot, and the motor unit each capable of being downsized in the axial direction even when the motor and the speed reducer are directly connected to each other.

DETAILED DESCRIPTION

Embodiments embodying the present disclosure are hereinafter described on the basis of the drawings.

First Embodiment

Configuration of Vertical Articulated Robot

The configuration of a vertical articulated robot 100 according to a first embodiment of the present disclosure is now described with reference to FIGS. 1 to 4.

Figure 1:
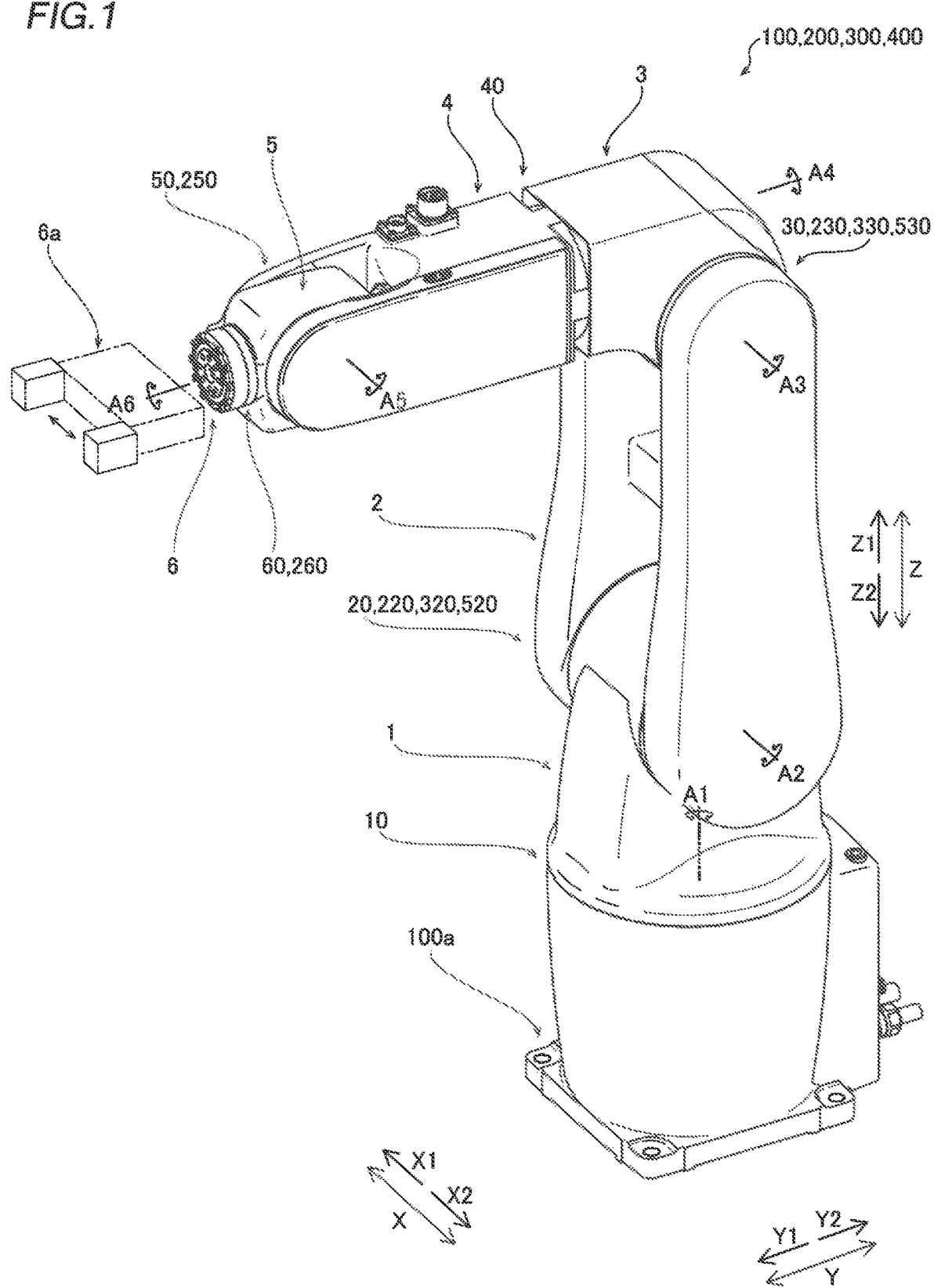
FIG. 1 is a perspective view showing the overall configuration of a vertical articulated robot according to first to fourth embodiments.

As shown in FIG. 1, the vertical articulated robot 100 is a six-axis robot having six degrees of freedom. The vertical articulated robot 100 is installed on an installation surface such as a floor via a base 100a.

The vertical articulated robot 100 includes a plurality of (six) arms 1 to 6 and a plurality of (six) joint axis portions 10 to 60 to rotationally drive the plurality of arms 1 to 6. The plurality of arms 1 to 6 include a first arm 1, a second arm 2, a third arm 3, a fourth arm 4, a fifth arm 5, and a sixth arm 6. The plurality of joint axis portions 10 to 60 include a first joint axis portion 10, a second joint axis portion 20, a third joint axis portion 30, a fourth joint axis portion 40, a fifth joint axis portion 50, and a sixth joint axis portion 60. The second joint axis portion 20, the third joint axis portion 30, and the fifth joint axis portion 50 are examples of a "narrow joint axis portion" in the claims. The fifth joint axis portion 50 is an example of a "wrist structure joint portion" in the claims.

The first joint axis portion 10 rotationally drives the first arm 1 around a rotation axis A1 extending along a vertical direction (Z direction). The first arm 1 connects the first joint axis portion 10 to the second joint axis portion 20. The second joint axis portion 20 rotationally drives the second arm 2 around a rotation axis A2 extending along a width direction (X direction, horizontal direction) orthogonal to a direction in which the second arm 2 extends. The second arm 2 connects the second joint axis portion 20 to the third joint axis portion 30. The third joint axis portion 30 rotationally drives the third arm 3 around a rotation axis A3 extending along the width direction (X direction, horizontal direction) orthogonal to a direction in which the third arm 3 extends. The third arm 3 connects the third joint axis portion 30 to the fourth joint axis portion 40.

The fourth joint axis portion 40 rotationally drives the fourth arm 4 around a rotation axis A4 extending along a direction (Y direction) in which the fourth arm 4 extends. The fourth arm 4 connects the fourth joint axis portion 40 to the fifth joint axis portion 50. The fifth joint axis portion 50 rotationally drives the fifth arm 5 around a rotation axis A5 extending along the horizontal direction (X direction). The fifth arm 5 connects the fifth joint axis portion 50 to the sixth joint axis portion 60. The sixth joint axis portion 60 rotationally drives the sixth arm 6 around a rotation axis A6 extending along a direction (Y direction) orthogonal to the rotation axis A5. The sixth arm 6 is a tool flange, and a tool 6a (end effector) is attached to the sixth arm 6. The fifth joint axis portion 50, the fifth arm 5, the sixth joint axis portion 60, and the sixth arm 6 correspond to a wrist structure provided on the distal side.

Configuration of Second Joint Axis Portion

Figure 2:
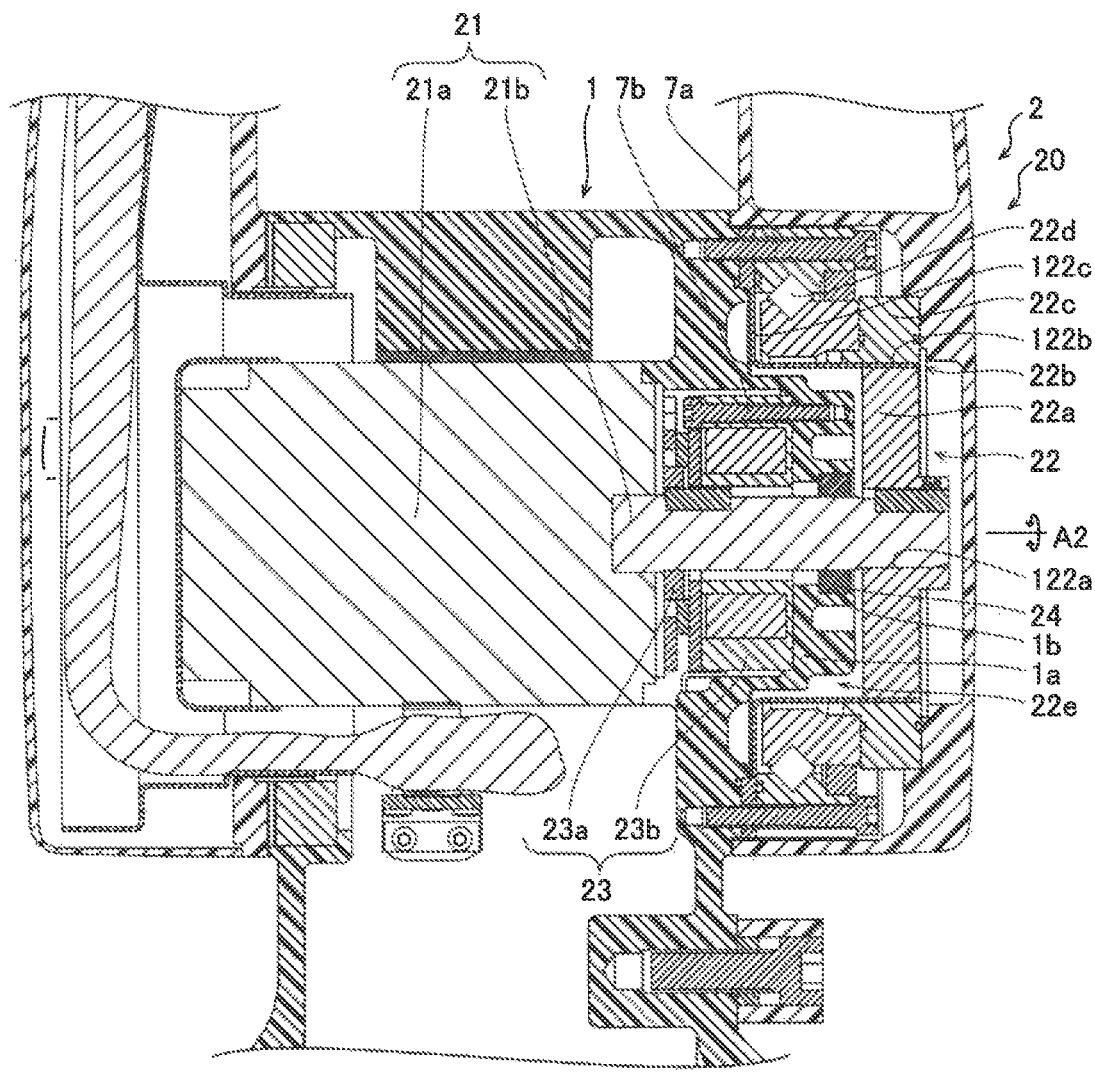
FIG. 2 is a sectional view showing a second joint axis portion of the vertical articulated robot according to the first embodiment.

As shown in FIG. 2, the second joint axis portion 20 includes a motor 21, a speed reducer 22, a brake 23, and an oil seal 24.

The motor 21 generates a driving force to rotationally drive the second arm 2. The motor 21 is attached to the first arm 1 by a fixing tool such as a screw (not shown). The motor 21 includes a housing 21a and a motor shaft 21b. The housing 21a houses a stator, a rotor, etc. On the other hand, the housing 21a does not house the brake and the oil seal. That is, the motor 21 is a motor without a brake and an oil seal, which does not include the brake and the oil seal in the housing 21a. Therefore, the housing 21a of the motor 21 has a smaller length in an axial direction (X direction) than a housing of a motor with a brake and an oil seal, which includes the brake and the oil seal in the housing. The motor shaft 21b is an output shaft of the motor 21, and extends along a direction (X direction) in which the rotation axis A2 extends. The motor shaft 21b is directly connected to the speed reducer 22.

The speed reducer 22 is arranged coaxially with the motor 21 and is directly connected to the motor shaft 21b of the motor 21. The speed reducer 22 is a wave gear speed reducer including a wave generator 22a, a flexspline 22b, and a circular spline 22c. The wave generator 22a is an input of the speed reducer 22, and the motor shaft 21b is inserted into a through-hole 122a for connection such that the wave generator 22a is connected to the motor shaft 21b. The flexspline 22b is a fixed portion of the speed reducer 22 and is attached to the circular spline 22c. The circular spline 22c is an output of the speed reducer 22 and is connected to the second arm 2. Furthermore, the speed reducer 22 includes a bearing 22d. The bearing 22d rotatably holds the circular spline 22c. The bearing 22d is a cross-roller bearing. The wave generator 22a is an example of a "shaft input" in the claims.

The wave generator 22a has an elliptical disk shape including the through-hole 122a for inserting the motor shaft 21b at the center of rotation. The wave generator 22a is attached to the flexspline 22b by being press-fitted into a cylindrical portion 122b of the flexspline 22b described below. The flexspline 22b includes the cylindrical portion 122b and a flange 122c. The cylindrical portion 122b has a hollow shape and extends along the direction (X direction) in which the rotation axis A2 extends. The cylindrical portion 122b includes external teeth that mesh with internal teeth of the circular spline 22c. The flange 122c has an annular shape and extends outward (to a side away from the center of rotation) from an end of the cylindrical portion 122b on the motor 21 side (X2 direction side). The circular spline 22c has an annular shape and includes the internal teeth that mesh with the external teeth of the flexspline 22b.

The flexspline 22b, which is the fixed portion of the speed reducer 22, is attached to the first arm 1 by a fixing tool 7a such as a screw at the flange 122c. Furthermore, the circular spline 22c, which is the output of the speed reducer 22, is attached to the second arm 2 by a fixing tool such as a screw (not shown).

The brake 23 holds the motor 21. The brake 23 is a non-excitation actuated electromagnetic brake that holds the motor 21 when it is not energized and releases the holding of the motor 21 when it is energized. A brake hub 23a of the brake 23 is attached to a base of the motor shaft 21b by being press-fitted into the motor shaft 21b. A main body 23b of the brake 23 is attached to a brake holder 1a of the first arm 1 by a fixing tool 7b such as a screw. The oil seal 24 seals the grease of the speed reducer 22. The oil seal 24 is mounted on the motor shaft 21b. The oil seal 24 is held by an oil seal holder 1b of the first arm 1.

The brake 23 and the oil seal 24 are provided outside the housing 21a of the motor 21 separately from the motor 21. The brake 23 and the oil seal 24 are arranged between the housing 21a of the motor 21 and the wave generator 22a of the speed reducer 22 in the direction (X direction) in which the rotation axis A2 extends. The brake 23 and the oil seal 24 are arranged in this order from the motor 21 side (X2 direction side) toward the speed reducer 22 side (X1 direction side).

In the first embodiment, the speed reducer 22 includes a recess 22e that is recessed along the direction (X direction) in which the rotation axis A2 extends. The recess 22e is defined by at least the wave generator 22a, the flexspline 22b, the circular spline 22c, and the bearing 22d. Specifically, the bottom of the recess 22e is defined by the wave generator 22a. A side of the recess 22e is defined by the flexspline 22b, the circular spline 22c, and the bearing 22d. The speed reducer 22 includes the recess 22e on the motor 21 side (X2 direction side). That is, the recess 22e is recessed from the motor 21 side (X2 direction side) toward the speed reducer 22 side (X1 direction side).

At least a portion (a portion on the X1 direction side) of the brake 23 and the oil seal 24 are arranged inside the recess 22e. That is, at least the portion of the brake 23 and the oil seal 24 are arranged so as to fit inside the recess 22e. At least the portion of the brake 23 and the oil seal 24 overlap the recess 22e (the cylindrical portion 122b of the flexspline 22b and the bearing 22d) as viewed in a direction (such as the Y direction or Z direction) orthogonal to the direction in which the rotation axis A2 extends.

Similarly, the brake holder 1a and the oil seal holder 1b are also arranged inside the recess 22e. That is, the brake holder 1a and the oil seal holder 1b are also arranged so as to fit inside the recess 22e. The brake holder 1a and the oil seal holder 1b also overlap the recess 22e (the cylindrical portion 122b of the flexspline 22b and the bearing 22d) as viewed in the direction (such as the Y direction or Z direction) orthogonal to the direction in which the rotation axis A2 extends.

Configuration of Third Joint Axis Portion

Figure 3:
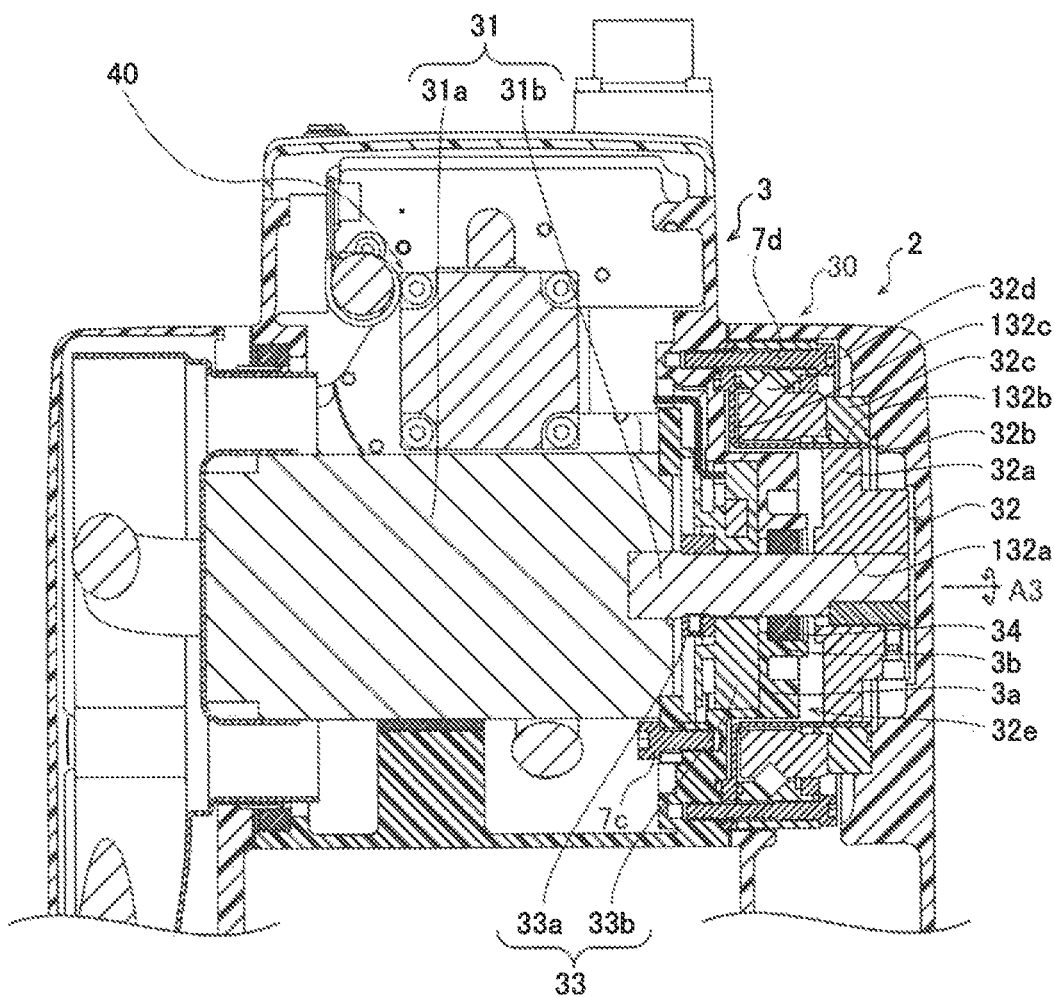
FIG. 3 is a sectional view showing a third joint axis portion of the vertical articulated robot according to the first embodiment.

As shown in FIG. 3, the third joint axis portion 30 includes a motor 31, a speed reducer 32, a brake 33, and an oil seal 34.

The motor 31 generates a driving force to rotationally drive the third arm 3. The motor 31 is attached to the third arm 3 by a fixing tool 7c such as a screw. The motor 31 includes a housing 31a and a motor shaft 31b. The housing 31a houses a stator, a rotor, etc. On the other hand, the housing 31a does not house a brake and an oil seal. That is, the motor 31 is a motor without a brake and an oil seal, which does not include the brake and the oil seal in the housing 31a. Therefore, the housing 31a of the motor 31 has a smaller length in an axial direction (X direction) than a housing of a motor with a brake and an oil seal, which includes the brake and the oil seal in the housing. The motor shaft 31b is an output shaft of the motor 31, and extends along a direction (X direction) in which the rotation axis A3 extends. The motor shaft 31b is directly connected to the speed reducer 32.

The speed reducer 32 is arranged coaxially with the motor 31 and is directly connected to the motor shaft 31b of the motor 31. The speed reducer 32 is a wave gear speed reducer including a wave generator 32a, a flexspline 32b, and a circular spline 32c. The wave generator 32a is an input of the speed reducer 32, and the motor shaft 31b is inserted into a through-hole 132a for connection such that the wave generator 32a is connected to the motor shaft 31b. The flexspline 32b is an output of the speed reducer 32 and is connected to the third arm 3. The circular spline 32c is a fixed portion of the speed reducer 32 and is attached to the flexspline 32b. Furthermore, the speed reducer 32 includes a bearing 32d. The bearing 32d rotatably holds the flexspline 32b. The bearing 32d is a cross-roller bearing. The wave generator 32a is an example of a "shaft input" in the claims.

The wave generator 32a has an elliptical disk shape including the through-hole 132a for inserting the motor shaft 31b at the center of rotation. The wave generator 32a is attached to the flexspline 32b by being press-fitted into a cylindrical portion 132b of the flexspline 32b described below. The flexspline 32b includes the cylindrical portion 132b and a flange 132c. The cylindrical portion 132b has a hollow shape and extends along the direction (X direction) in which the rotation axis A3 extends. The cylindrical portion 132b includes external teeth that meshes with internal teeth of the circular spline 32c. The flange 132c has an annular shape and extends outward (to a side away from the center of rotation) from an end of the cylindrical portion 132b on the motor 21 side (X2 direction side). The circular spline 32c has an annular shape and includes the internal teeth that mesh with the external teeth of the flexspline 32b.

The flexspline 32b, which is the output of the speed reducer 32, is attached to the third arm 3 by a fixing tool 7d such as a screw at the flange 132c. Furthermore, the circular spline 32c, which is the fixed portion of the speed reducer 32, is attached to the second arm 2 by a fixing tool such as a screw (not shown).

The brake 33 holds the motor 31. The brake 33 is a non-excitation actuated electromagnetic brake that holds the motor 31 when it is not energized and releases the holding of the motor 31 when it is energized. A brake hub 33a of the brake 33 is attached to a base of the motor shaft 31b by a set screw. A main body 33b of the brake 33 is attached to a brake holder 3a of the third arm 3 by a fixing tool such as a screw (not shown). The oil seal 34 seals the grease of the speed reducer 32. The oil seal 34 is mounted on the motor shaft 31b. The oil seal 34 is held by an oil seal holder 3b of the third arm 3.

The brake 33 and the oil seal 34 are provided outside the housing 31a of the motor 31 separately from the motor 31. The brake 33 and the oil seal 34 are arranged between the housing 31a of the motor 31 and the wave generator 32a of the speed reducer 32 in the direction (X direction) in which the rotation axis A3 extends. The brake 33 and the oil seal 34 are arranged in this order from the motor 31 side (X2 direction side) toward the speed reducer 32 side (X1 direction side).

In the first embodiment, the speed reducer 32 includes a recess 32e that is recessed along the direction (X direction) in which the rotation axis A3 extends. The recess 32e is defined by at least the wave generator 32a, the flexspline 32b, the circular spline 32c, and the bearing 32d. Specifically, the bottom of the recess 32e is defined by the wave generator 32a. A side of the recess 32e is defined by the flexspline 32b, the circular spline 32c, and the bearing 32d. The speed reducer 32 includes the recess 32e on the motor 31 side (X2 direction side). That is, the recess 32e is recessed from the motor 31 side (X2 direction side) toward the speed reducer 32 side (X1 direction side).

At least a portion (a portion on the X1 direction side) of the brake 33 and the oil seal 34 are arranged inside the recess 32e. That is, at least the portion of the brake 33 and the oil seal 34 are arranged so as to fit inside the recess 32e. At least the portion of the brake 33 and the oil seal 34 overlap the recess 32e (the cylindrical portion 132b of the flexspline 32b and the bearing 32d) as viewed in a direction (such as the Y direction or Z direction) orthogonal to the direction in which the rotation axis A3 extends.

Similarly, the brake holder 3a and the oil seal holder 3b are also arranged inside the recess 32e. That is, the brake holder 3a and the oil seal holder 3b are also arranged so as to fit inside the recess 32e. The brake holder 3a and the oil seal holder 3b also overlap the recess 32e (the cylindrical portion 132b of the flexspline 32b and the bearing 32d) as viewed in the direction (such as the Y direction or Z direction) orthogonal to the direction in which the rotation axis A3 extends.

Configuration of Fifth Joint Axis Portion

Figure 4:
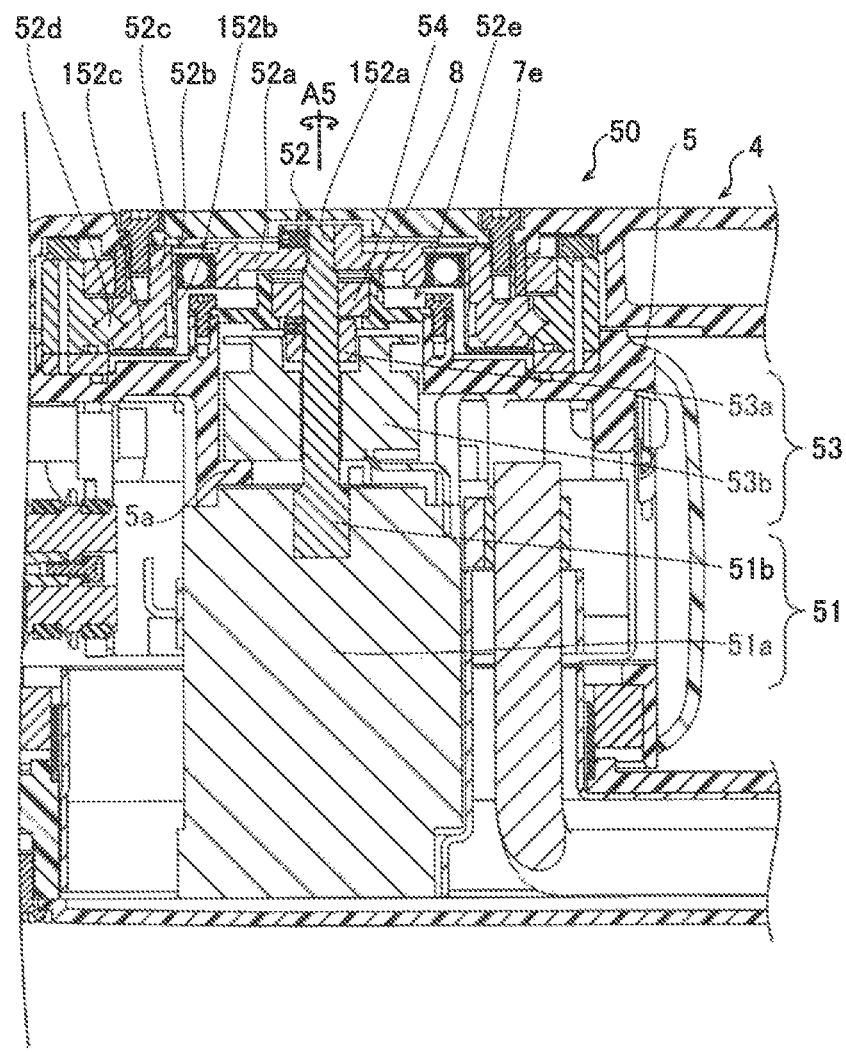
FIG. 4 is a sectional view showing a fifth joint axis portion of the vertical articulated robot according to the first embodiment.

As shown in FIG. 4, the fifth joint axis portion 50 includes a motor 51, a speed reducer 52, a brake 53, and an oil seal 54.

The motor 51 generates a driving force to rotationally drive the fifth arm 5. The motor 51 is attached to the fifth arm 5 by a fixing tool such as a screw (not shown). The motor 51 includes a housing 51a and a motor shaft 51b. The housing 51a houses a stator, a rotor, etc. On the other hand, the housing 51a does not house a brake and an oil seal. That is, the motor 51 is a motor without a brake and an oil seal, which does not include the brake and the oil seal in the housing 51a. Therefore, the housing 51a of the motor 51 has a smaller length in an axial direction (X direction) than a housing of a motor with a brake and an oil seal, which includes the brake and the oil seal in the housing. The motor shaft 51b is an output shaft of the motor 51, and extends along a direction (X direction) in which the rotation axis A5 extends. The motor shaft 51b is directly connected to the speed reducer 52.

The speed reducer 52 is arranged coaxially with the motor 51 and is directly connected to the motor shaft 51b of the motor 51. The speed reducer 52 is a wave gear speed reducer including a wave generator 52a, a flexspline 52b, and a circular spline 52c. The wave generator 52a is an input of the speed reducer 52, and the motor shaft 51b is inserted into a through-hole 152a for connection such that the wave generator 52a is connected to the motor shaft 51b. The flexspline 52b is an output of the speed reducer 52 and is connected to the fifth arm 5. The circular spline 52c is a fixed portion of the speed reducer 52 and is attached to the flexspline 52b. Furthermore, the speed reducer 52 includes a bearing 52d. The bearing 52d rotatably holds the flexspline 52b. The bearing 52d is a cross-roller bearing. The wave generator 52a is an example of a "shaft input" in the claims.

The wave generator 52a has an elliptical disk shape including the through-hole 152a for inserting the motor shaft 51b at the center of rotation. The wave generator 52a is attached to the flexspline 52b by being press-fitted into a cylindrical portion 152b of the flexspline 52b described below. The flexspline 52b includes the cylindrical portion 152b and a flange 152c. The cylindrical portion 152b has a hollow shape and extends along the direction (X direction) in which the rotation axis A5 extends. The cylindrical portion 152b includes external teeth that mesh with internal teeth of the circular spline 52c. The flange 152c has an annular shape and extends outward (to a side away from the center of rotation) from an end of the cylindrical portion 152b on the motor 51 side (X2 direction side). The circular spline 52c has an annular shape and includes the internal teeth that mesh with the external teeth of the flexspline 52b.

The flexspline 52b, which is the output of the speed reducer 52, is attached to the fifth arm 5 by a fixing tool such as a screw (not shown) at the flange 152c. Furthermore, the circular spline 52c, which is the fixed portion of the speed reducer 52, is attached to the fourth arm 4 by a fixing tool 7e such as a screw.

The brake 53 holds the motor 51. The brake 53 is a non-excitation actuated electromagnetic brake that holds the motor 51 when it is not energized and releases the holding of the motor 51 when it is energized. A brake hub 53a of the brake 53 is attached to a central portion of the motor shaft 51b by a set screw. A main body 53b of the brake 53 is attached to a brake holder 5a of the fifth arm 5 by a fixing tool such as a screw (not shown). The oil seal 54 seals the grease of the speed reducer 52. The oil seal 54 is mounted on the motor shaft 51b. The oil seal 54 is held by an oil seal holder 8 provided separately from the fourth arm 4 and the fifth arm 5.

The brake 53 and the oil seal 54 are provided outside the housing 51a of the motor 51, separately from the motor 51. The brake 53 and the oil seal 54 are arranged between the housing 51a of the motor 51 and the wave generator 52a of the speed reducer 52 in the direction (X direction) in which the rotation axis A5 extends. The brake 53 and the oil seal 54 are arranged in this order from the motor 51 side (X2 direction side) toward the speed reducer 52 side (X1 direction side).

In the first embodiment, the speed reducer 52 includes a recess 52e that is recessed along the direction (X direction) in which the rotation axis A5 extends. The recess 52e is defined by at least the wave generator 52a, the flexspline 52b, the circular spline 52c, and the bearing 52d. Specifically, the bottom of the recess 52e is defined by the wave generator 52a. A side of the recess 52e is defined by the flexspline 52b, the circular spline 52c, and the bearing 52d. The speed reducer 52 includes the recess 52e on the motor 51 side (X2 direction side). That is, the recess 52e is recessed from the motor 51 side (X2 direction side) toward the speed reducer 52 side (X1 direction side).

At least a portion (a portion on the X1 direction side) of the brake 53 and the oil seal 54 are arranged inside the recess 52e. That is, at least the portion of the brake 53 and the oil seal 54 are arranged so as to fit inside the recess 52e. At least the portion of the brake 53 and the oil seal 54 overlap the recess 52e (the cylindrical portion 152b of the flexspline 52b, the circular spline 52c, and the bearing 52d) as viewed in a direction (such as the Y direction or Z direction) orthogonal to the direction in which the rotation axis A5 extends.

Similarly, the oil seal holder 8 is also arranged inside the recess 52e. That is, the oil seal holder 8 is also arranged so as to fit inside the recess 52e. The oil seal holder 8 also overlaps the recess 52e (the cylindrical portion 152b of the flexspline 52b, the circular spline 52c, and the bearing 52d) as viewed in the direction (such as the Y direction or Z direction) orthogonal to the direction in which the rotation axis A5 extends.

Advantageous Effects of First Embodiment

According to the first embodiment, the following advantageous effects are achieved.

According to the first embodiment, as described above, the joint axis portion 20 (30, 50) includes the motor 21 (31, 51) including the motor shaft 21b (31b, 51b), and the speed reducer 22 (32, 52) directly connected to the motor shaft 21b (31b, 51b). Accordingly, the motor 21 (31, 51) and the speed reducer 22 (32, 52) can be directly connected to each other without a timing belt, and thus unlike a case in which the motor 21 (31, 51) and the speed reducer 22 (32, 52) are connected to each other via a timing belt, a decrease in the positioning accuracy due to stretching of the timing belt can be prevented. Furthermore, as described above, the speed reducer 22 (32, 52) of the joint axis portion 20 (30, 50) includes the recess 22e (32e, 52e) that is recessed along a rotation axis direction, and at least the portion of the brake 23 (33, 53) and the oil seal 24 (34, 54) are arranged inside the recess 22e (32e, 52e). Thus, at least the portion of the brake 23 (33, 53) and the oil seal 24 (34, 54) can be arranged using a space inside the recess 22e (32e, 52e) of the speed reducer 22 (32, 52). Therefore, even when the motor 21 (31, 51) and the speed reducer 22 (32, 52) are directly connected to each other, the joint axis portion 20 (30, 50) can be downsized in the axial direction. Consequently, the joint axis portion 20 (30, 50) can be downsized in the axial direction while a decrease in positioning accuracy due to the stretching of the timing belt is prevented.

According to the first embodiment, as described above, the joint axis portion 20 (30, 50) that rotationally drives the arm 2 (3, 5) around the rotation axis extending along the width direction orthogonal to the direction in which the arm 2 (3, 5) extends is configured as the narrow joint axis portion. Accordingly, the arm 2 (3, 5) can be downsized in the width direction (axial direction) by a decrease in the size of the joint axis portion 20 (30, 50) in the axial direction orthogonal to the direction in which the arm 2 (3, 5) extends. Thus, due to a decrease in the size of the arm 2 (3, 5) in the width direction orthogonal to the direction in which the arm 2 (3, 5) extends, the vertical articulated robot 100 can enter a narrower space. Consequently, the degree of freedom for the work of the vertical articulated robot 100 can be improved.

According to the first embodiment, as described above, the joint axis portion 50, which is a wrist structure joint portion provided on the distal side, is configured as the narrow joint axis portion. Accordingly, the arm 5 corresponding to the wrist structure can be downsized in the width direction (axial direction) orthogonal to the direction in which the arm 5 extends by a decrease in the size of the joint axis portion 50 in the axial direction. Thus, due to a decrease in the size of the arm 5 corresponding to the wrist structure in the width direction orthogonal to the direction in which the arm 5 extends, the vertical articulated robot 100 can more easily enter a narrower space. Consequently, the degree of freedom for the work of the vertical articulated robot 100 can be further improved.

According to the first embodiment, as described above, the speed reducer 22 (32, 52) includes the wave gear speed reducer. Furthermore, the wave gear speed reducer includes the wave generator 22a (32a, 52a), the circular spline 22c (32c, 52c), and the flexspline 22b (32b, 52b). Moreover, at least the portion of the brake 23 (33, 53) and the oil seal 24 (34, 54) are arranged inside the recess 22e defined by at least the wave generator 22a (32a, 52a), the circular spline 22c (32c, 52c), the flexspline 22b (32b, 52b), and the bearing 22d (32d, 52d). Accordingly, at least the portion of the brake 23 (33, 53) and the oil seal 24 (34, 54) can be arranged using the space inside the recess 22e (32e, 52e) defined by the wave generator 22a (32a, 52a), the circular spline 22c (32c, 52c), the flexspline 22b (32b, 52b), and the bearing 22d (32d, 52d) of the speed reducer 22 (32, 52), which is the wave gear speed reducer, and thus the joint axis portion 20 (30, 50) can be easily downsized in the axial direction.

According to the first embodiment, as described above, the recess 22e (32e, 52e) is provided on the motor 21 (31, 51) side. Furthermore, at least the portion of the brake 23 (33, 53) and the oil seal 24 (34, 54) are arranged inside the recess 22e (32e, 52e). Accordingly, the joint axis portion 20 (30, 50) can be downsized in the axial direction while the brake 23 (33, 53) and the oil seal 24 (34, 54) are arranged on the motor 21 (31, 51) side. Furthermore, the brake 23 (33, 53) can be arranged on the motor 21 (31, 51) side, and thus the brake 23 (33, 53) can be arranged as close to the motor 21 (31, 51) as possible. Consequently, the motor 21 (31, 51) can be stably held by the brake 23 (33, 53).

Second Embodiment

A second embodiment is now described with reference to FIGS. 1 and 5 to 11. In this second embodiment, an example in which a joint axis portion includes a motor unit is described unlike the first embodiment. In the figures, the same or similar configurations as those of the first embodiment are denoted by the same reference numerals, and description thereof is omitted.

Configuration of Vertical Articulated Robot

As shown in FIG. 1, a vertical articulated robot 200 according to the second embodiment is different from the vertical articulated robot 100 according to the first embodiment in that the vertical articulated robot 200 includes a second joint axis portion 220, a third joint axis portion 230, a fifth joint axis portion 250, and a sixth joint axis portion 260. The second joint axis portion 220, the third joint axis portion 230, and the fifth joint axis portion 250 are examples of a "narrow joint axis portion" in the claims. The fifth joint axis portion 250 is an example of a "wrist structure joint portion" in the claims. The sixth joint axis portion 260 is an example of a "distal joint axis portion" in the claims.

Configuration of Second Joint Axis Portion

Figure 5:
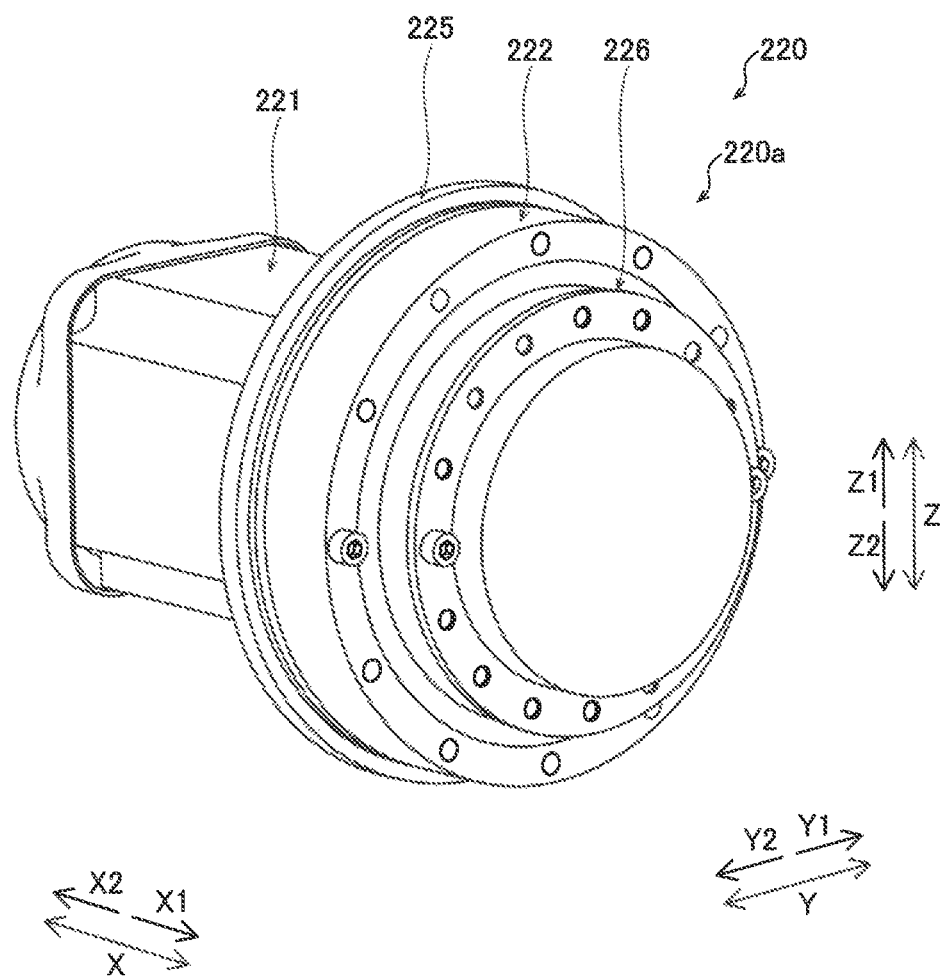
FIG. 5 is a perspective view showing a motor unit of a second joint axis portion of a vertical articulated robot according to a second embodiment.
Figure 6:
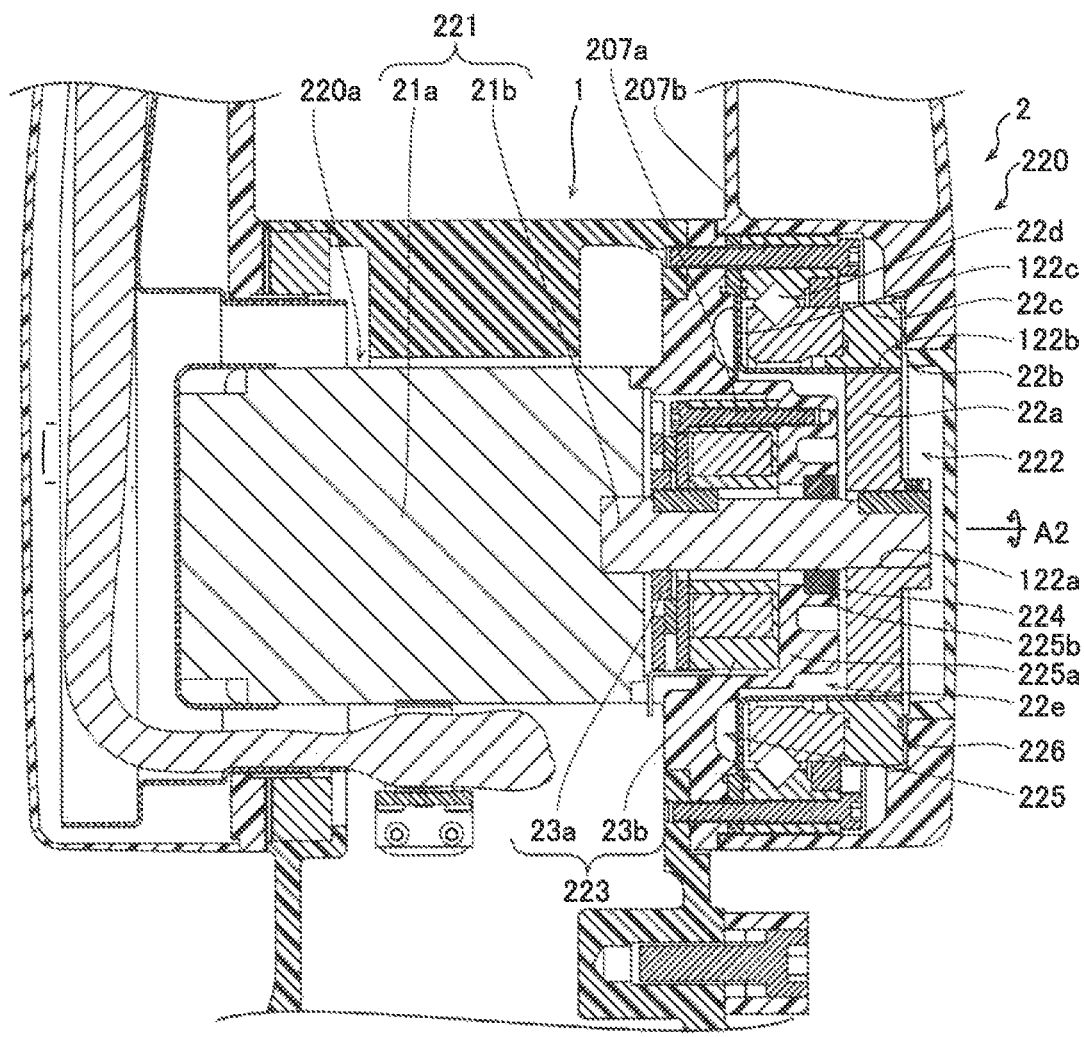
FIG. 6 is a sectional view showing the second joint axis portion of the vertical articulated robot according to the second embodiment.

In the second embodiment, as shown in FIGS. 5 and 6, the second joint axis portion 220 includes a motor unit 220a integrally including a motor 221, a speed reducer 222, a brake 223, an oil seal 224, and a holding member 225. The motor unit 220a is attachable and detachable while integrally including the motor 221, the speed reducer 222, the brake 223, the oil seal 224, and the holding member 225.

The motor 221, the speed reducer 222, the brake 223, and the oil seal 224 have the same or similar configurations as the motor 21, the speed reducer 22, the brake 23, and the oil seal 24 according to the first embodiment, respectively. Therefore, detailed description of the same or similar configurations as those of the first embodiment is omitted, and configurations different from those of the first embodiment are described below.

The motor 221 is attached to the holding member 225 by a fixing tool such as a screw (not shown). The speed reducer 222 is attached to the holding member 225 by a fixing tool such as a screw (not shown). Specifically, a flexspline 22*b* of the speed reducer 222 is attached to the holding member 225 by a fixing tool such as a screw (not shown). The holding member 225 is attached to a first arm 1 by a fixing tool 207*b* such as a screw. A holding member 226 is provided on a circular spline 22*c* of the speed reducer 222 to prevent grease leakage. The circular spline 22*c* of the speed reducer 222 is attached to a second arm 2 via the holding member 226. The brake 223 is attached to a brake holder 225*a* of the holding member 225 by a fixing tool 207*a* such as a screw. The oil seal 224 is held by an oil seal holder 225*b* of the holding member 225. The holding member 225 integrally holds the motor 221, the speed reducer 222, the brake 223, and the oil seal 224. While integrally including the motor 221, the speed reducer 222, the brake 223, the oil seal 224, and the holding member 225, the motor unit 220*a* is attached to the first arm 1 via the holding member 225 by the fixing tool 207*b* such as a screw, and is attached to the second arm 2 via the holding member 226.

Also in the second embodiment, at least a portion (a portion on the X1 direction side) of the brake 223 and the oil seal 224 are arranged inside a recess 22*e*. That is, at least a portion of the brake 223 and the oil seal 224 are arranged so as to fit inside the recess 22*e*. At least the portion of the brake 223 and the oil seal 224 overlap the recess 22*e* (a cylindrical portion 122*b* of the flexspline 22*b* and a bearing 22*d*) as viewed in a direction (such as a Y direction or Z direction) orthogonal to a direction in which a rotation axis A2 extends.

In the second embodiment, the brake holder 225*a* and the oil seal holder 225*b* of the holding member 225 are arranged inside the recess 22*e*. That is, the brake holder 225*a* and the oil seal holder 225*b* are arranged so as to fit inside the recess 22*e*. The brake holder 225*a* and the oil seal holder 225*b* overlap the recess 22*e* (the cylindrical portion 122*b* of the flexspline 22*b* and the bearing 22*d*) as viewed in the direction (such as the Y direction or Z direction) orthogonal to the direction in which the rotation axis A2 extends.

Configuration of Third Joint Axis Portion

Figure 7:
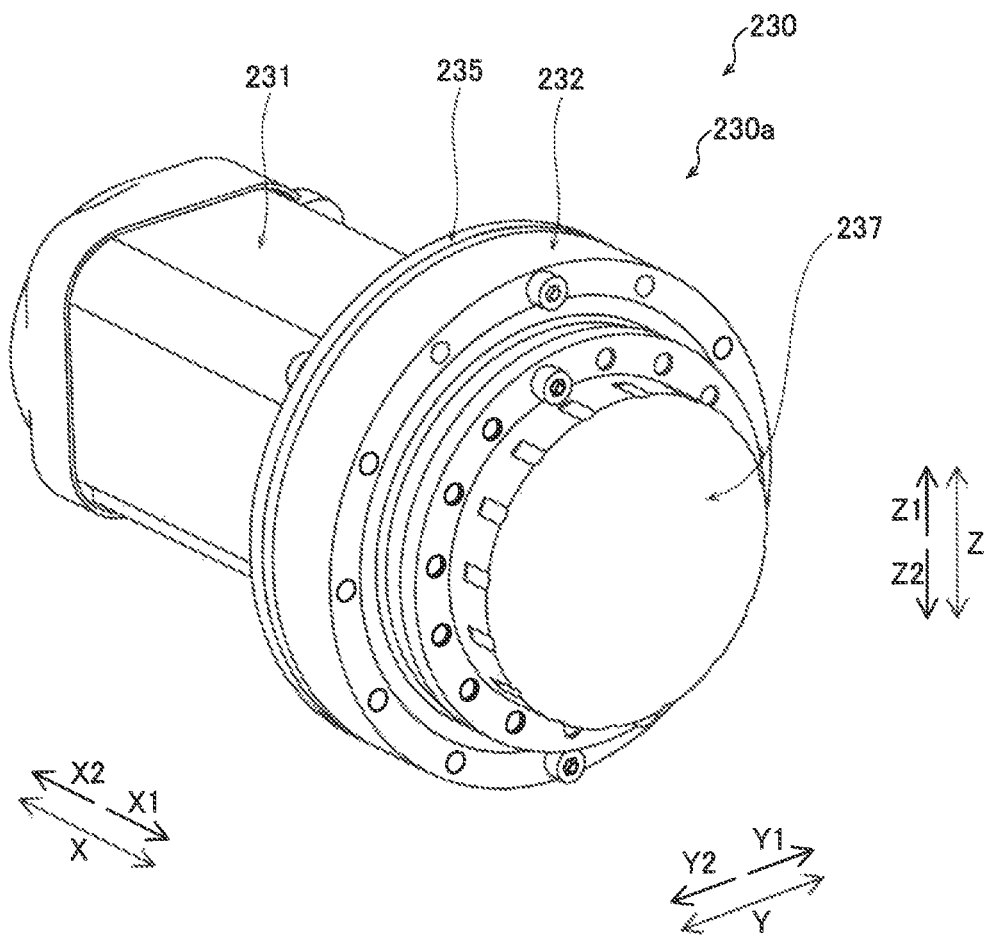
FIG. 7 is a perspective view showing a motor unit of a third joint axis portion of the vertical articulated robot according to the second embodiment.
Figure 8:
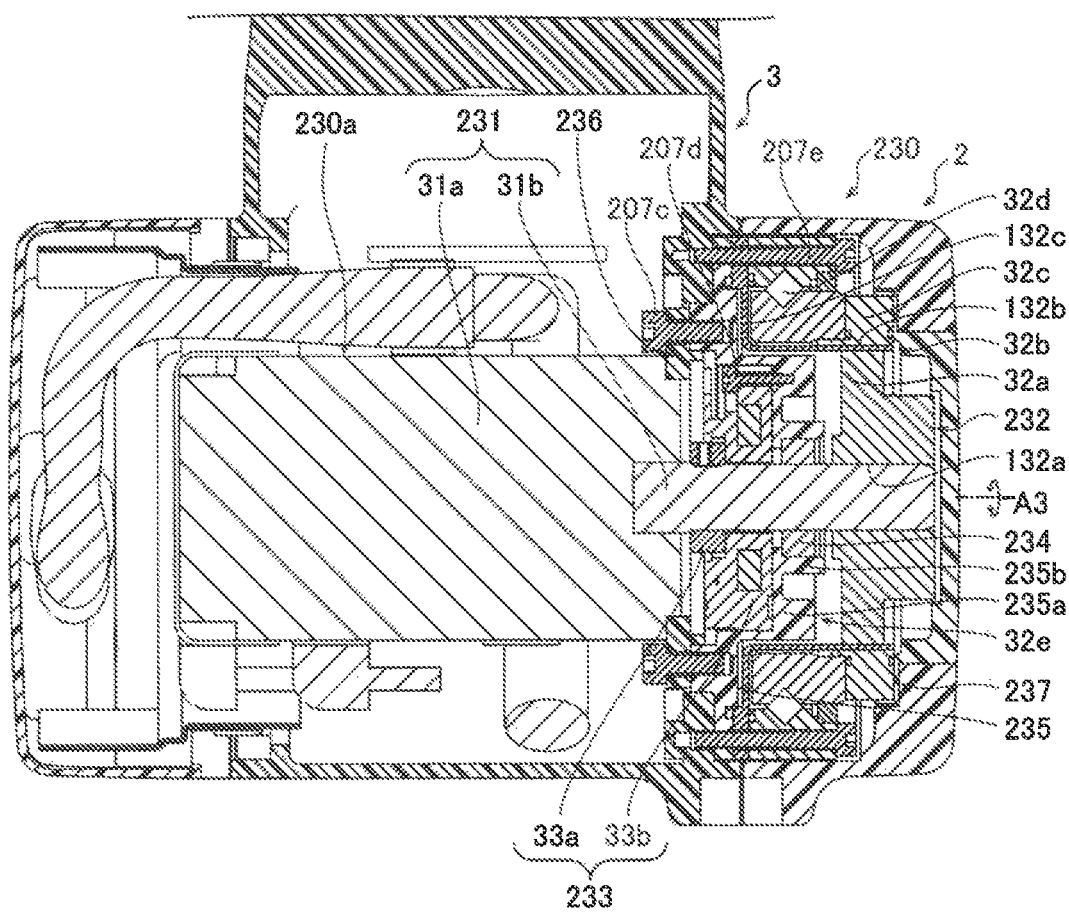
FIG. 8 is a sectional view showing the third joint axis portion of the vertical articulated robot according to the second embodiment.

In the second embodiment, as shown in FIGS. 7 and 8, the third joint axis portion 230 includes a motor unit 230*a* integrally including a motor 231, a speed reducer 232, a brake 233, an oil seal 234, and a holding member 235. The motor unit 230*a* is attachable and detachable while integrally including the motor 231, the speed reducer 232, the brake 233, the oil seal 234, and the holding member 235.

The motor 231 and the speed reducer 232, the brake 233, and the oil seal 234 have the same or similar configurations as the motor 31, speed reducer 32, the brake 33, and the oil seal 34 according to the first embodiment, respectively. Therefore, detailed description of the same or similar configurations as those of the first embodiment is omitted, and configurations different from those of the first embodiment are described below.

The motor 231 is attached to a holding member 236 by a fixing tool such as a screw (not shown). The motor 231 is attached to the holding member 235 by a fixing tool 207*c* such as a screw via the holding member 236. The holding member 235 is attached to a third arm 3 by a fixing tool such as a screw (not shown). The speed reducer 232 is attached to the holding member 235 by a fixing tool such as a screw (not shown). Specifically, a flexspline 32*b* of the speed reducer 232 is attached to the second arm 2 via the holding member 235. A holding member 227 is provided on a circular spline 32*c* of the speed reducer 232 to prevent grease leakage. The circular spline 32*c* of the speed reducer 232 is attached to the second arm 2 via the holding member 227. The brake 233 is attached to a brake holder 235*a* of the holding member 235 by a fixing tool 207*d* such as a screw. The oil seal 234 is held by an oil seal holder 235*b* of the holding member 235. The holding member 235 integrally holds the motor 231, the speed reducer 232, the brake 233, and the oil seal 234. While integrally including the motor 231, the speed reducer 232, the brake 233, the oil seal 234, and the holding member 235, the motor unit 230*a* is attached to the third arm 3 via the holding member 235 by a fixing tool 207*e* such as a screw, and is attached to the second arm 2 via the holding member 237.

Also in the second embodiment, at least a portion (a portion on the X1 direction side) of the brake 233 and the oil seal 234 are arranged inside a recess 32*e*. That is, at least the portion of the brake 233 and the oil seal 234 are arranged so as to fit inside the recess 32*e*. At least the portion of the brake 233 and the oil seal 234 overlap the recess 32*e* (a cylindrical portion 132*b* of the flexspline 32*b* and a bearing 32*d*) as viewed in a direction (such as the Y direction or Z direction) orthogonal to a direction in which a rotation axis A3 extends.

In the second embodiment, the brake holder 235*a* and the oil seal holder 235*b* of the holding member 235 are arranged inside the recess 32*e*. That is, the brake holder 235*a* and the oil seal holder 235*b* are arranged so as to fit inside the recess 32*e*. The brake holder 235*a* and the oil seal holder 235*b* overlap the recess 32*e* (the cylindrical portion 132*b* of the flexspline 32*b* and the bearing 32*d*) as viewed in the direction (such as the Y direction or Z direction) orthogonal to the direction in which the rotation axis A3 extends.

Configurations of Fifth and Sixth Joint Axis Portions

Figure 9:
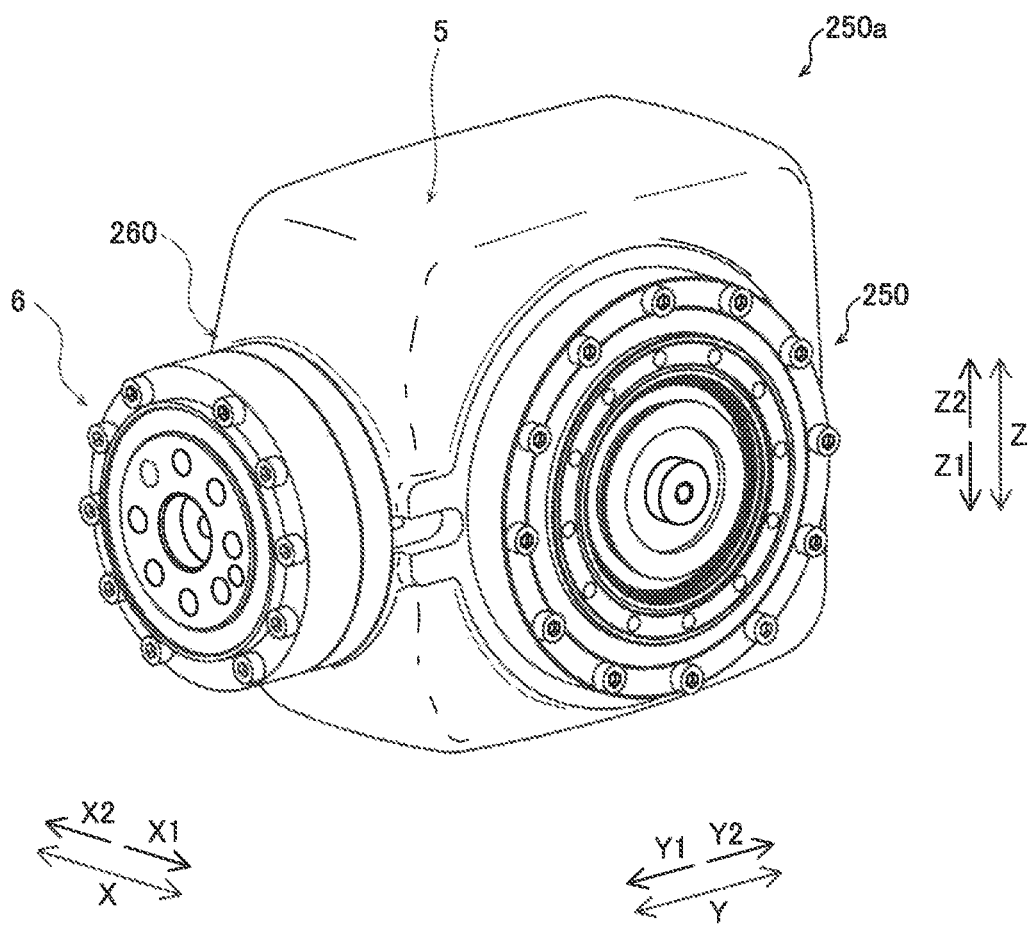
FIG. 9 is a perspective view showing a fifth and sixth joint axis portion unit of the vertical articulated robot according to the second embodiment.
Figure 10:
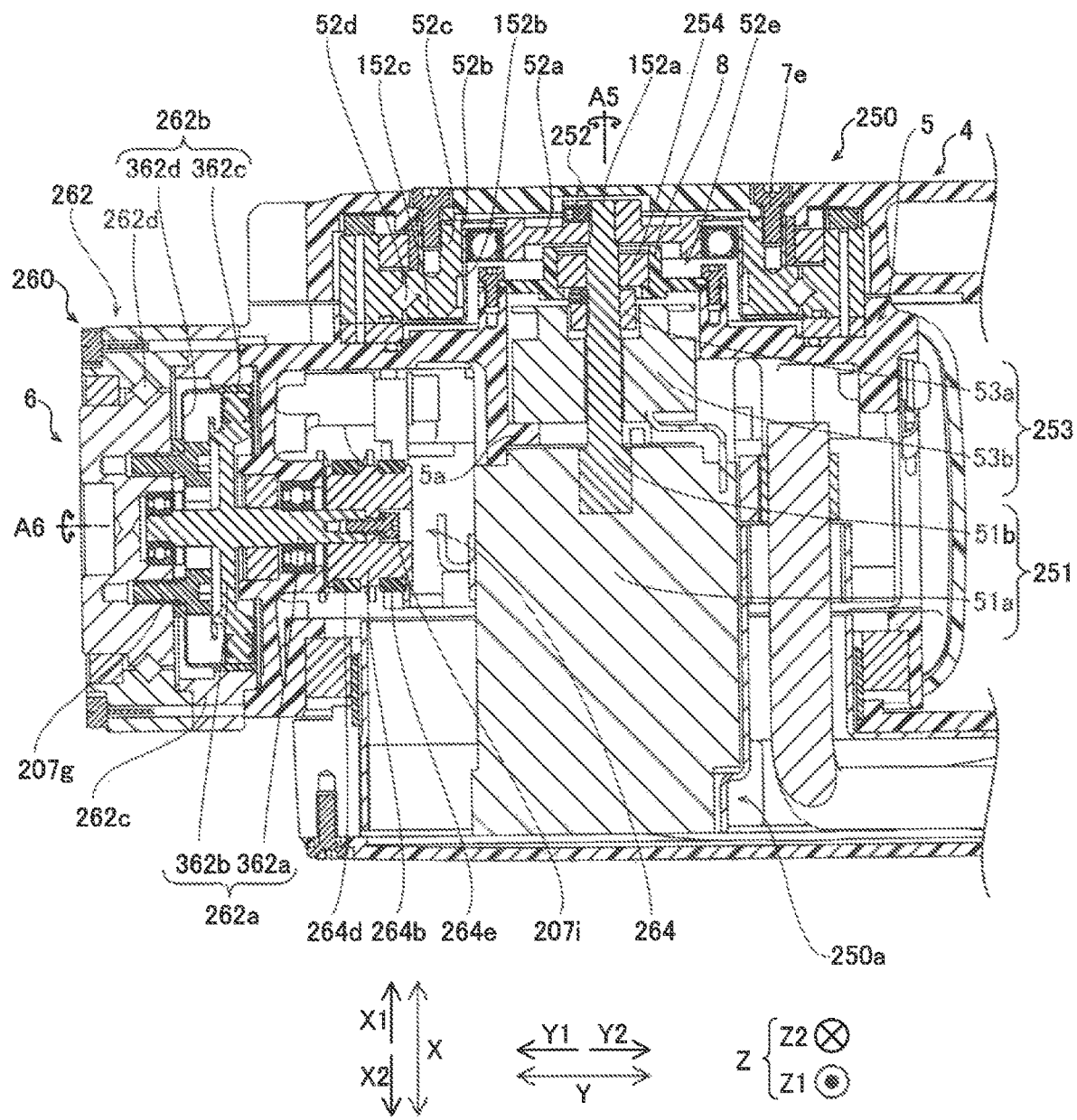
FIG. 10 is a sectional view showing a fifth and sixth joint axis portion of the vertical articulated robot according to the second embodiment.
Figure 11:
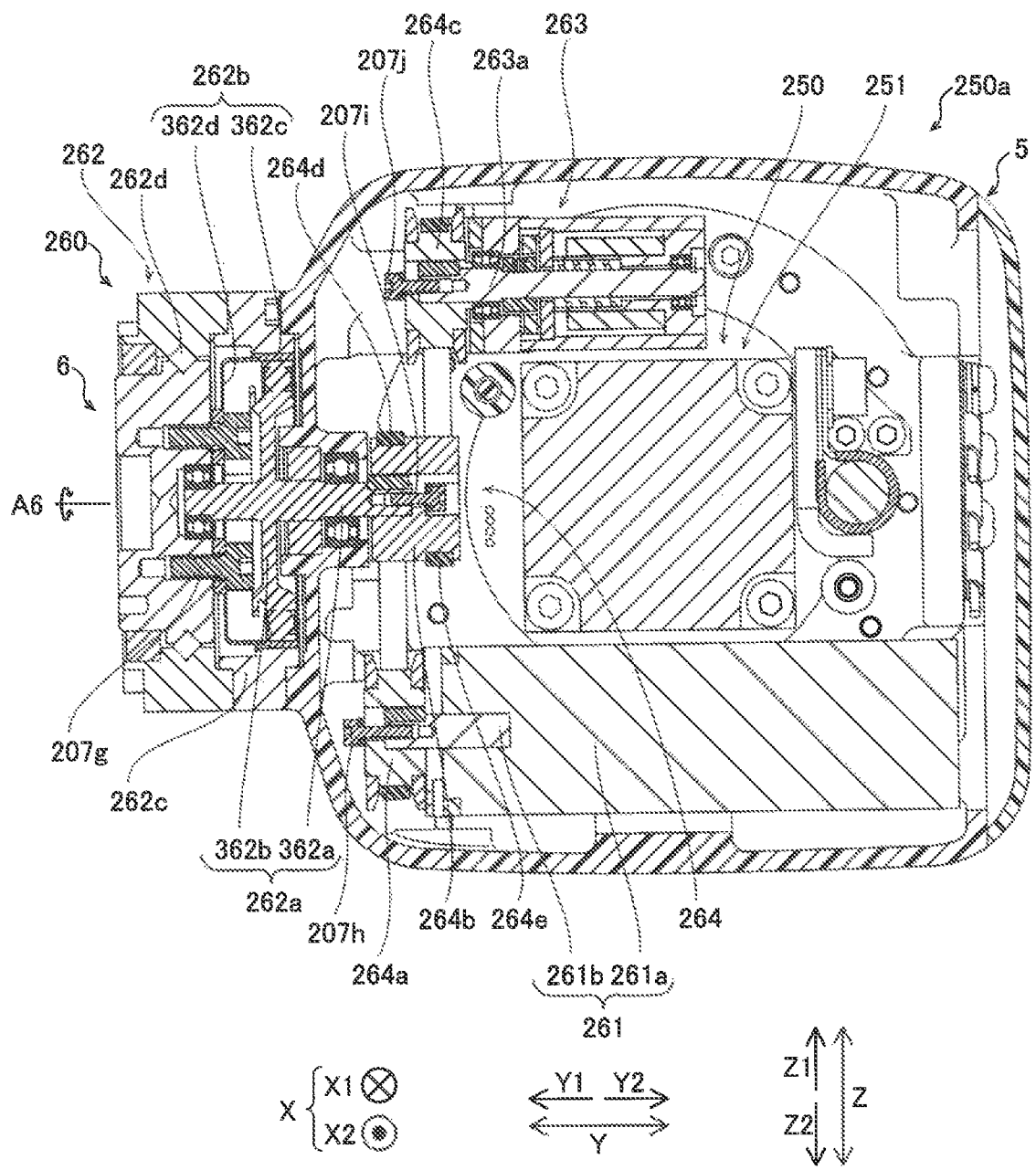
FIG. 11 is a sectional view showing a fifth and sixth joint axis portion of the vertical articulated robot according to the second embodiment.

As shown in FIGS. 9 to 11, the fifth joint axis portion 250 and the sixth joint axis portion 260 form a fifth and sixth joint axis portion unit 250*a* integrally including the fifth joint axis portion 250, the sixth joint axis portion 260, a fifth arm 5, and a sixth arm 6. The fifth and sixth joint axis portion unit 250*a* is attachable and detachable while integrally including the fifth joint axis portion 250, the sixth joint axis portion 260, the fifth arm 5, and the sixth arm 6. The fifth and sixth joint axis portion unit 250*a* is an example of a "distal joint axis portion unit" in the claims.

The fifth joint axis portion 250 includes a motor 251, a speed reducer 252, a brake 253, and an oil seal 254. The motor 251, the speed reducer 252, the brake 253, and the oil seal 254 have the same or similar configurations as the motor 51, the speed reducer 52, the brake 53, and the oil seal 54 according to the first embodiment, respectively. Therefore, detailed description of the same or similar configurations as those of the first embodiment is omitted, and configurations different from those of the first embodiment are described below.

Also in the second embodiment, at least a portion (a portion on the X1 direction side) of the brake 253 and the oil seal 254 are arranged inside a recess 52*e*. That is, at least the portion of the brake 253 and the oil seal 254 are arranged so as to fit inside the recess 52*e*. At least the portion of the brake 253 and the oil seal 254 overlap the recess 52*e* (a cylindrical portion 152*b* of a flexspline 52*b*, a circular spline 52*c*, and a bearing 52*d*) as viewed in a direction (such as the Y direction or Z direction) orthogonal to a direction in which a rotation axis A5 extends.

The sixth joint axis portion 260 includes a motor 261 and a speed reducer 262, a brake 263, and a belt mechanism 264.

The motor 261 generates a driving force to rotationally drive the sixth arm 6 that is a tool flange. The motor 261 is attached to the fifth arm 5 by a fixing tool such as a screw (not shown). The motor 261 includes a housing 261a and a motor shaft 261b. The housing 261a houses a stator, a rotor, etc. On the other hand, the housing 261a does not house a brake. That is, the motor 261 is a brakeless motor, which does not include the brake in the housing 261a. Therefore, the housing 261a of the motor 261 has a smaller length in an axial direction (Y direction) than a housing of a motor with a brake, which includes the brake in the housing. The motor shaft 261b is an output shaft of the motor 261 and extends along a direction (Y direction) in which a rotation axis A6 extends. The motor shaft 261b is connected to the speed reducer 262 via the belt mechanism 264.

The speed reducer 262 is arranged such that the axis thereof does not overlap the axis of the motor 261 and is connected to the motor shaft 261b of the motor 261 via the belt mechanism 264. The speed reducer 262 is a wave gear speed reducer including a wave generator 262a, a flexspline 262b, and a circular spline 262c. The wave generator 262a is an input of the speed reducer 262, and an input shaft 362a is connected to a pulley 264b of the belt mechanism 264 described below such that the wave generator 262a is connected to the motor shaft 261b via the belt mechanism 264. The flexspline 262b is an output of the speed reducer 262 and is connected to the sixth arm 6. The circular spline 262c is a fixed portion of the speed reducer 262 and is attached to the flexspline 262b. The speed reducer 262 includes a bearing 262d. The bearing 262d rotatably holds the flexspline 262b. The bearing 262d is a cross-roller bearing.

The wave generator 262a includes the input shaft 362a and a disk 362b. The disk 362b is press-fitted into a cylindrical portion 362c of the flexspline 262b described below such that the wave generator 262a is attached to the flexspline 262b. The flexspline 262b has a cup shape and includes the cylindrical portion 362c that is a side of the cup and a bottom 362d of the cup. The cylindrical portion 362c has a hollow shape and extends along the direction (Y direction) in which the rotation axis A6 extends. The cylindrical portion 362c includes external teeth that mesh with internal teeth of the circular spline 262c. The bottom 362d extends inward (to a side closer to the center of rotation) from an end of the cylindrical portion 362c on a side (Y1 direction side) opposite to the motor 261 side. The circular spline 262c has an annular shape and includes the internal teeth that mesh with the external teeth of the flexspline 262b.

The flexspline 262b, which is the output of the speed reducer 262, is attached to the sixth arm 6 by a fixing tool 207g such as a screw at the bottom 362d. The circular spline 262c, which is the fixed portion of the speed reducer 262, is attached to the fifth arm 5 by a fixing tool such as a screw (not shown).

The brake 263 holds the motor 261. The brake 263 is a non-excitation actuated electromagnetic brake that holds the motor 261 when it is not energized and releases the holding of the motor 261 when it is energized. The brake 263 is provided outside the housing 261a of the motor 261 separately from the motor 261. The brake 263 is arranged so as to face the motor 261 across the motor 251 in the direction (Z direction) orthogonal to the direction in which the rotation axis A5 extends.

The belt mechanism 264 transmits the driving force of the motor 261 to the speed reducer 262. The belt mechanism 264 transmits the holding force of the brake 263 to the motor 261. The belt mechanism 264 includes a plurality of (three) pulleys 264a to 264c and a plurality of (two) belts 264d and 264e. The pulley 264a is attached to the motor shaft 261b by a fixing tool 207h such as a screw. The pulley 264b is attached to the input shaft 362a of the wave generator 262a by a fixing tool 207i such as a screw. The pulley 264c is attached to an input shaft 263a of the brake 263 by a fixing tool 207j such as a screw. The belt 264d is hung between the pulley 264a and the pulley 264b. The belt 264e is mounted between the pulley 264b and the pulley 264c.

The fifth and sixth joint axis portion unit 250a integrally includes the motor 251, the speed reducer 252, the brake 253, and the oil seal 254 of the fifth joint axis portion 250, the motor 261, the speed reducer 262, the brake 263, and the belt mechanism 264 of the sixth joint axis portion 260, an oil seal holder 8, the fifth arm 5, and the sixth arm 6.

The remaining configurations of the second embodiment are similar to those of the first embodiment.

Advantageous Effects of Second Embodiment

According to the second embodiment, the following advantageous effects are achieved.

According to the second embodiment, as described above, the joint axis portion 220 (230, 250) is configured similarly to the first embodiment. Accordingly, similarly to the first embodiment, even when the motor 21 (31, 51) and the speed reducer 22 (32, 52) are directly connected to each other, the joint axis portion 220 (230, 250) can be downsized in the axial direction.

According to the second embodiment, as described above, the joint axis portion 220 (230) includes the motor unit 220a (230a) integrally including the motor 221 (231), the speed reducer 222 (232), the brake 223 (233), and the oil seal 224 (234). Accordingly, the motor 221 (231), the speed reducer 222 (232), the brake 223 (233), and the oil seal 224 (234) can be handled integrally, and thus the motor 221 (231), the speed reducer 222 (232), the brake 223 (233), and the oil seal 224 (234) can be easily assembled and replaced as compared with a case in which the motor 221 (231), the speed reducer 222 (232), the brake 223 (233), and the oil seal 224 (234) cannot be handled integrally.

According to the second embodiment, as described above, the fifth joint axis portion 250 and the sixth joint axis portion 260 integrally form the fifth and sixth joint axis portion unit 250a. Accordingly, the fifth joint axis portion 250 and the sixth joint axis portion 260 can be handled integrally, and thus the fifth joint axis portion 250 and the sixth joint axis portion 260 can be easily assembled and replaced as compared with a case in which the fifth joint axis portion 250 and the sixth joint axis portion 260 cannot be handled integrally. Furthermore, the fifth joint axis portion 250 and the sixth joint axis portion 260, which are portions corresponding to the wrist structure, can be formed as the fifth and sixth joint axis portion unit 250a, and thus the wrist structure can be downsized as compared with a case in which the fifth joint axis portion 250 and the sixth joint axis portion 260 is not formed as a unit. Consequently, due to a decrease in the size of the wrist structure, the vertical articulated robot 200 can more easily enter a narrower space. Thus, the degree of freedom for the work of the vertical articulated robot 200 can be further improved.

The remaining advantageous effects of the second embodiment are similar to those of the first embodiment.

Third Embodiment

A third embodiment is now described with reference to FIGS. 1, 12, and 13. In this third embodiment, an example in which a speed reducer includes a recess on a side opposite to the motor side is described unlike the first and second embodiments. In the figures, the same or similar configurations as those of the first embodiment are denoted by the same reference numerals, and description thereof is omitted.

Configuration of Vertical Articulated Robot

As shown in FIG. 1, a vertical articulated robot 300 according to the third embodiment is different from the vertical articulated robot 100 according to the first embodiment in that the vertical articulated robot 300 includes a second joint axis portion 320 and a third joint axis portion 330. The second joint axis portion 320 and the third joint axis portion 330 are examples of a "narrow joint axis portion" in the claims.

Configuration of Second Joint Axis Portion

Figure 12:
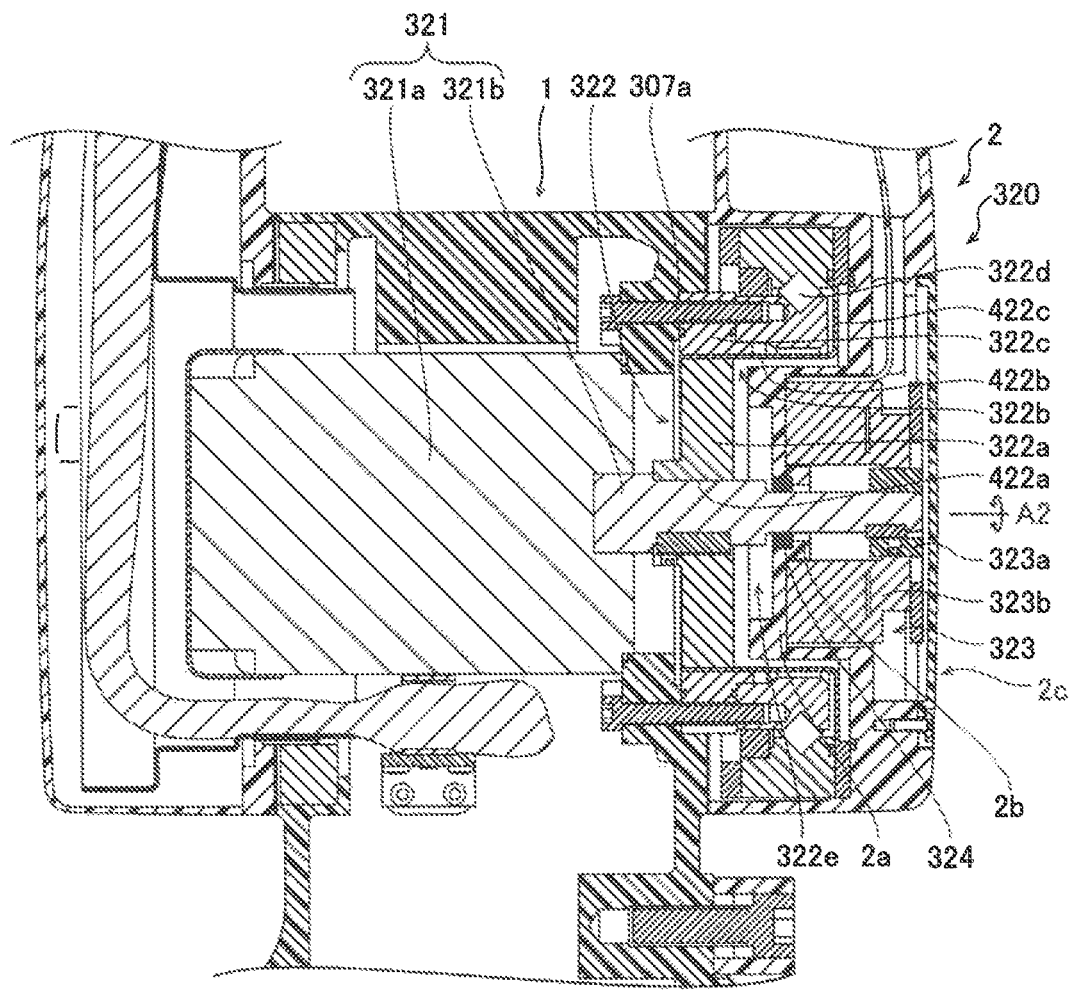
FIG. 12 is a sectional view showing a second joint axis portion of a vertical articulated robot according to a third embodiment.

As shown in FIG. 12, the second joint axis portion 320 includes a motor 321, a speed reducer 322, a brake 323, and an oil seal 324.

The motor 321 generates a driving force to rotationally drive a second arm 2. The motor 321 is attached to a first arm 1 by a fixing tool such as a screw (not shown). The motor 321 includes a housing 321a and a motor shaft 321b. The housing 321a houses a stator, a rotor, etc. On the other hand, the housing 321a does not house a brake and an oil seal. That is, the motor 321 is a motor without a brake and an oil seal, which does not include the brake and the oil seal in the housing 321a. Therefore, the housing 321a of the motor 321 has a smaller length in an axial direction (X direction) than a housing of a motor with a brake and an oil seal, which includes the brake and the oil seal in the housing. The motor shaft 321b is an output shaft of the motor 321 and extends along a direction (X direction) in which a rotation axis A2 extends. The motor shaft 321b is directly connected to the speed reducer 322.

The speed reducer 322 is arranged coaxially with the motor 321 and is directly connected to the motor shaft 321b of the motor 321. The speed reducer 322 is a wave gear speed reducer including a wave generator 322a, a flexspline 322b, and a circular spline 322c. The wave generator 322a is an input of the speed reducer 322, and the motor shaft 321b is inserted into a through-hole 422a for connection such that the wave generator 322a is connected to the motor shaft 321b. The flexspline 322b is an output of the speed reducer 322 and is connected to the second arm 2. The circular spline 322c is a fixed portion of the speed reducer 322 and is attached to the flexspline 322b. Furthermore, the speed reducer 322 includes a bearing 322d. The bearing 322d rotatably holds the flexspline 322b. The bearing 322d is a cross-roller bearing. The wave generator 322a is an example of a "shaft input" in the claims.

The wave generator 322a has an elliptical disk shape including the through-hole 422a for inserting the motor shaft 321b at the center of rotation. The wave generator 322a is attached to the flexspline 322b by being press-fitted into a cylindrical portion 422b of the flexspline 322b described below. The flexspline 322b includes the cylindrical portion 422b and a flange 422c. The cylindrical portion 422b has a hollow shape and extends along the direction (X direction) in which the rotation axis A2 extends. The cylindrical portion 422b includes external teeth that mesh with internal teeth of the circular spline 322c. The flange 422c has an annular shape and extends outward (to a side away from the center of rotation) from an end of the cylindrical portion 422b on a side (X1 direction side) opposite to the motor 321 side. The circular spline 322c has an annular shape and includes the internal teeth that mesh with the external teeth of the flexspline 322b.

The flexspline 322b, which is the output of the speed reducer 322, is attached to the second arm 2 by a fixing tool such as a screw (not shown) at the flange 422c. Furthermore, the circular spline 322c, which is the fixed portion of the speed reducer 322, is attached to the first arm 1 by a fixing tool 307a such as a screw.

The brake 323 holds the motor 321. The brake 323 is a non-excitation actuated electromagnetic brake that holds the motor 321 when it is not energized and releases the holding of the motor 321 when it is energized. A brake hub 323a of the brake 323 is attached to a distal end of the motor shaft 321b by being press-fitted into the motor shaft 321b. A main body 323b of the brake 323 is attached to a brake holder 2a of the second arm 2 by a fixing tool such as a screw (not shown). The oil seal 324 seals the grease of the speed reducer 322. The oil seal 324 is mounted on the motor shaft 321b. The oil seal 324 is held by an oil seal holder 2b of the second arm 2.

The brake 323 and the oil seal 324 are provided outside the housing 321a of the motor 321 separately from the motor 321. The brake 323 and the oil seal 324 are arranged outside the housing 321a of the motor 321 and the wave generator 322a of the speed reducer 322 in the direction (X direction) in which the rotation axis A2 extends. The oil seal 324 and the brake 323 are arranged in this order from the motor 321 side (X2 direction side) toward the speed reducer 322 side (X1 direction side).

In the third embodiment, the speed reducer 322 includes a recess 322e that is recessed along the direction (X direction) in which the rotation axis A2 extends. The recess 322e is defined by at least the wave generator 322a, the flexspline 322b, the circular spline 322c, and the bearing 322d. Specifically, the bottom of the recess 322e is defined by the wave generator 322a. A side of the recess 322e is defined by the flexspline 322b, the circular spline 322c, and the bearing 322d. The speed reducer 322 includes the recess 322e on the side (X1 direction side) opposite to the motor 321 side. That is, the recess 322e is recessed from the speed reducer 322 side (X1 direction side) toward the motor 321 side (X2 direction side).

At least a portion (a portion on the X1 direction side) of the brake 323 and the oil seal 324 are arranged inside the recess 322e. That is, at least the portion of the brake 323 and the oil seal 324 are arranged so as to fit inside the recess 322e. At least the portion of the brake 323 and the oil seal 324 overlap the recess 322e (the cylindrical portion 422b of the flexspline 322b and the bearing 322d) as viewed in a direction (such as a Y direction or Z direction) orthogonal to the direction in which the rotation axis A2 extends.

Similarly, the brake holder 2a and the oil seal holder 2b are also arranged inside the recess 322e. That is, the brake holder 2a and the oil seal holder 2b are also arranged so as to fit inside the recess 322e. The brake holder 2a and the oil seal holder 2b also overlap the recess 322e (the cylindrical portion 422b of the flexspline 322b and the bearing 322d) as viewed in the direction (such as the Y direction or Z direction) orthogonal to the direction in which the rotation axis A2 extends.

In the third embodiment, the brake 323 is arranged so as to face a brake maintenance lid 2c of the second arm 2. The brake maintenance lid 2c is attachable to and detachable from a main body of the second arm 2. The brake maintenance lid 2c exposes the brake 323 together with the fixing tool of the brake 323 to the outside when being removed from the main body of the second arm 2. Thus, maintenance of the brake 323 such as replacement of the brake 323 can be easily performed. Furthermore, the brake maintenance lid 2c covers the brake 323 when being attached to the main body of the second arm 2. The brake 323 is arranged in the vicinity of or adjacent to the outer surface of the second arm 2.

Configuration of Third Joint Axis Portion

Figure 13:
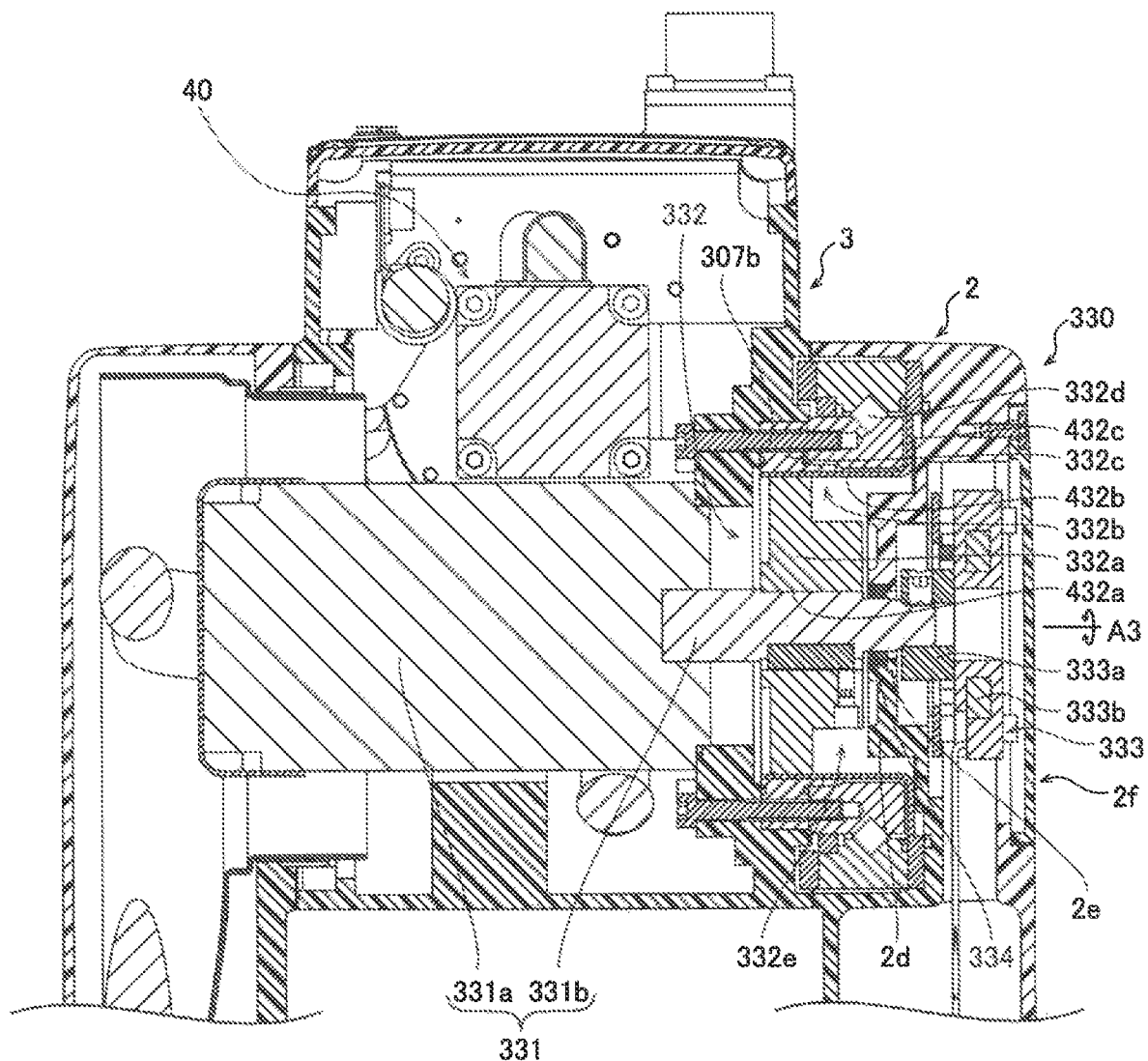
FIG. 13 is a sectional view showing a third joint axis portion of the vertical articulated robot according to the third embodiment.

As shown in FIG. 13, the third joint axis portion 330 includes a motor 331, a speed reducer 332, a brake 333, and an oil seal 334.

The motor 331 generates a driving force to rotationally drive a third arm 3. The motor 331 is attached to the third arm 3 by a fixing tool such as a screw (not shown). The motor 331 includes a housing 331a and a motor shaft 331b. The housing 331a houses a stator, a rotor, etc. On the other hand, the housing 331a does not house a brake and an oil seal. That is, the motor 331 is a motor without a brake and an oil seal, which does not include the brake and the oil seal in the housing 331a. Therefore, the housing 331a of the motor 331 has a smaller length in the axial direction (X direction) than a housing of a motor with a brake and an oil seal, which includes the brake and the oil seal in the housing. The motor shaft 331b is an output shaft of the motor 331, and extends along a direction (X direction) in which a rotation axis A3 extends. The motor shaft 331b is directly connected to the speed reducer 332.

The speed reducer 332 is arranged coaxially with the motor 331 and is directly connected to the motor shaft 331b of the motor 331. The speed reducer 332 is a wave gear speed reducer including a wave generator 332a, a flexspline 332b, and a circular spline 332c. The wave generator 332a is an input of the speed reducer 332, and the motor shaft 331b is inserted into a through-hole 432a for connection such that the wave generator 332a is connected to the motor shaft 331b. The flexspline 332b is a fixed portion of the speed reducer 332 and is attached to the circular spline 332c. The circular spline 332c is an output of the speed reducer 332 and is connected to the third arm 3. Furthermore, the speed reducer 332 includes a bearing 332d. The bearing 332d rotatably holds the circular spline 332c. The bearing 332d is a cross-roller bearing. The wave generator 332a is an example of a "shaft input" in the claims.

The wave generator 332a has an elliptical disk shape including the through-hole 432a for inserting the motor shaft 331b at the center of rotation. The wave generator 332a is attached to the flexspline 332b by being press-fitted into a cylindrical portion 432b of the flexspline 332b described below. The flexspline 332b includes the cylindrical portion 432b and a flange 432c. The cylindrical portion 432b has a hollow shape and extends along the direction (X direction) in which the rotation axis A3 extends. The cylindrical portion 432b includes external teeth that mesh with internal teeth of the circular spline 332c. The flange 432c has an annular shape and extends outward (to a side away from the center of rotation) from an end of the cylindrical portion 432b on a side (X1 direction side) opposite to the motor 331 side. The circular spline 332c has an annular shape and includes the internal teeth that mesh with the external teeth of the flexspline 332b.

The flexspline 332b, which is the fixed portion of the speed reducer 332, is attached to the second arm 2 by a fixing tool such as a screw (not shown) at the flange 432c. Furthermore, the circular spline 332c, which is the output of the speed reducer 322, is attached to the third arm 3 by a fixing tool 307b such as a screw.

The brake 333 holds the motor 331. The brake 333 is a non-excitation actuated electromagnetic brake that holds the motor 331 when it is not energized and releases the holding of the motor 331 when it is energized. A brake hub 333a of the brake 333 is attached to a distal end of the motor shaft 331b by being fixed to the motor shaft 331b by a set screw. A main body 333b of the brake 333 is attached to a brake holder 2d of the second arm 2 by a fixing tool such as a screw (not shown). The oil seal 334 seals the grease of the speed reducer 332. The oil seal 334 is mounted on the motor shaft 331b. The oil seal 334 is held by an oil seal holder 2e of the second arm 2.

The brake 333 and the oil seal 334 are provided outside the housing 331a of the motor 331 separately from the motor 331. The brake 333 and the oil seal 334 are arranged outside the housing 331a of the motor 331 and the wave generator 332a of the speed reducer 332 in the direction (X direction) in which the rotation axis A3 extends. The oil seal 334 and the brake 333 are arranged in this order from the motor 331 side (X2 direction side) toward the speed reducer 332 side (X1 direction side).

In the third embodiment, the speed reducer 332 includes a recess 332e that is recessed along the direction (X direction) in which the rotation axis A3 extends. The recess 332e is defined by at least the wave generator 332a, the flexspline 332b, the circular spline 332c, and the bearing 332d. Specifically, the bottom of the recess 332e is defined by the wave generator 332a. A side of the recess 332e is defined by the flexspline 332b, the circular spline 332c, and the bearing 332d. The speed reducer 332 includes the recess 332e on the side (X1 direction side) opposite to the motor 331 side. That is, the recess 332e is recessed from the speed reducer 332 side (X1 direction side) toward the motor 321 side (X2 direction side).

At least a portion (a portion on the X1 direction side) of the brake 333 and the oil seal 334 are arranged inside the recess 332e. That is, at least the portion of the brake 333 and the oil seal 334 are arranged so as to fit inside the recess 332e. At least the portion of the brake 333 and the oil seal 334 overlap the recess 332e (the cylindrical portion 432b of the flexspline 332b and the bearing 332d) as viewed in a direction (such as the Y direction or Z direction) orthogonal to the direction in which the rotation axis A3 extends.

Similarly, the brake holder 2d and the oil seal holder 2e are also arranged inside the recess 332e. That is, the brake holder 2d and the oil seal holder 2e are also arranged so as to fit inside the recess 332e. The brake holder 2d and the oil seal holder 2e also overlap the recess 332e (the cylindrical portion 432b of the flexspline 332b and the bearing 332d) as viewed in the direction (such as the Y direction or Z direction) orthogonal to the direction in which the rotation axis A3 extends.

In the third embodiment, the brake 333 is arranged so as to face a brake maintenance lid 2f of the second arm 2. The brake maintenance lid 2f is attachable to and detachable from the main body of the second arm 2. The brake maintenance lid 2f exposes the brake 333 together with the fixing tool of the brake 333 to the outside when being removed from the main body of the second arm 2. Thus, maintenance of the brake 333 such as replacement of the brake 333 can be easily performed. Furthermore, the brake maintenance lid 2f covers the brake 333 when being attached to the main body of the second arm 2. The brake 333 is arranged in the vicinity of or adjacent to the outer surface of the second arm 2.

The remaining configurations of the third embodiment are similar to those of the first embodiment.

Advantageous Effects of Third Embodiment

According to the third embodiment, the following advantageous effects are achieved.

According to the third embodiment, as described above, the joint axis portion 320 (330) includes the motor 321 (331) including the motor shaft 321b (331b), and the speed reducer 322 (332) directly connected to the motor shaft 321b (331b). Accordingly, the motor 321 (331) and the speed reducer 322 (332) can be directly connected to each other without a timing belt, and thus unlike a case in which the motor 321 (31) and the speed reducer 322 (332) are connected to each other via a timing belt, a decrease in the positioning accuracy due to stretching of the timing belt can be prevented. Furthermore, as described above, the speed reducer 322 (332) of the joint axis portion 320 (330) includes the recess 322e (332e) that is recessed along a rotation axis direction, and at least the portion of the brake 323 (333) and the oil seal 324 (334) are arranged inside the recess 322e (332e). Thus, at least the portion of the brake 323 (333) and the oil seal 324 (334) can be arranged using a space inside the recess 322e (332e) of the speed reducer 322 (332), and thus even when the motor 321 (331) and the speed reducer 322 (332) are directly connected to each other, the joint axis portion 320 (330) can be downsized in the axial direction. Consequently, the joint axis portion 320 (330) can be downsized in the axial direction while a decrease in positioning accuracy due to the stretching of the timing belt is prevented.

According to the third embodiment, as described above, the recess 322e (332e) is provided on the side opposite to the motor 321 (331) side. Furthermore, at least the portion of the brake 323 (333) and the oil seal 324 (334) are arranged inside the recess 322e (332e). Accordingly, the joint axis portion 320 (330) can be downsized in the axial direction while the brake 323 (333) and the oil seal 324 (334) are arranged on the side opposite to the motor 321 (331) side. Moreover, the brake 323 (333) can be arranged on the side opposite to the motor 321 (331) side, and thus the brake 323 (333) can be arranged as close to the surface of the arm 2 as possible. Consequently, the brake 323 (333) can be arranged at a position at which maintenance work for the brake 323 (333) such as replacement of the brake 323 (333) can be easily performed.

The remaining advantageous effects of the third embodiment are similar to those of the first embodiment.

Fourth Embodiment

A fourth embodiment is now described with reference to FIGS. 1 and 14 to 17. In this fourth embodiment, an example in which a joint axis portion includes a motor unit is described unlike the third embodiment. In the figures, the same or similar configurations as those of the first embodiment are denoted by the same reference numerals, and description thereof is omitted.

Configuration of Vertical Articulated Robot

As shown in FIG. 1, a vertical articulated robot 400 according to the fourth embodiment is different from the vertical articulated robot 100 according to the first embodiment in that the vertical articulated robot 400 includes a second joint axis portion 520 and a third joint axis portion 530. The second joint axis portion 520 and the third joint axis portion 530 are examples of a "narrow joint axis portion" in the claims.

Configuration of Second Joint Axis Portion

Figure 14:
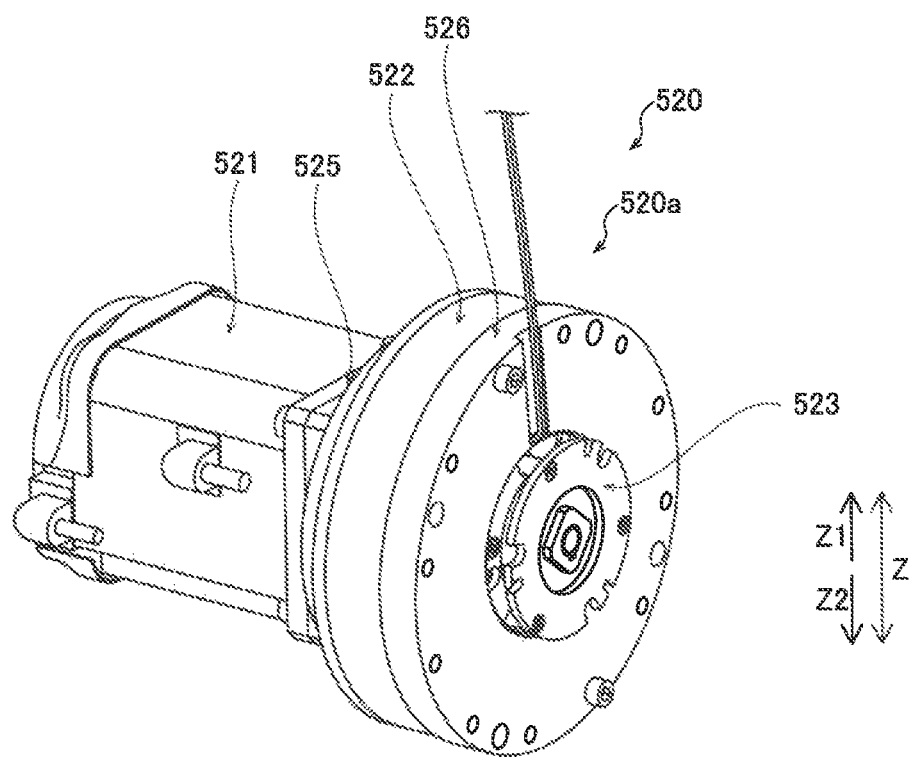
FIG. 14 is a perspective view showing a motor unit of a second joint axis portion of a vertical articulated robot according to a fourth embodiment.
Figure 15:
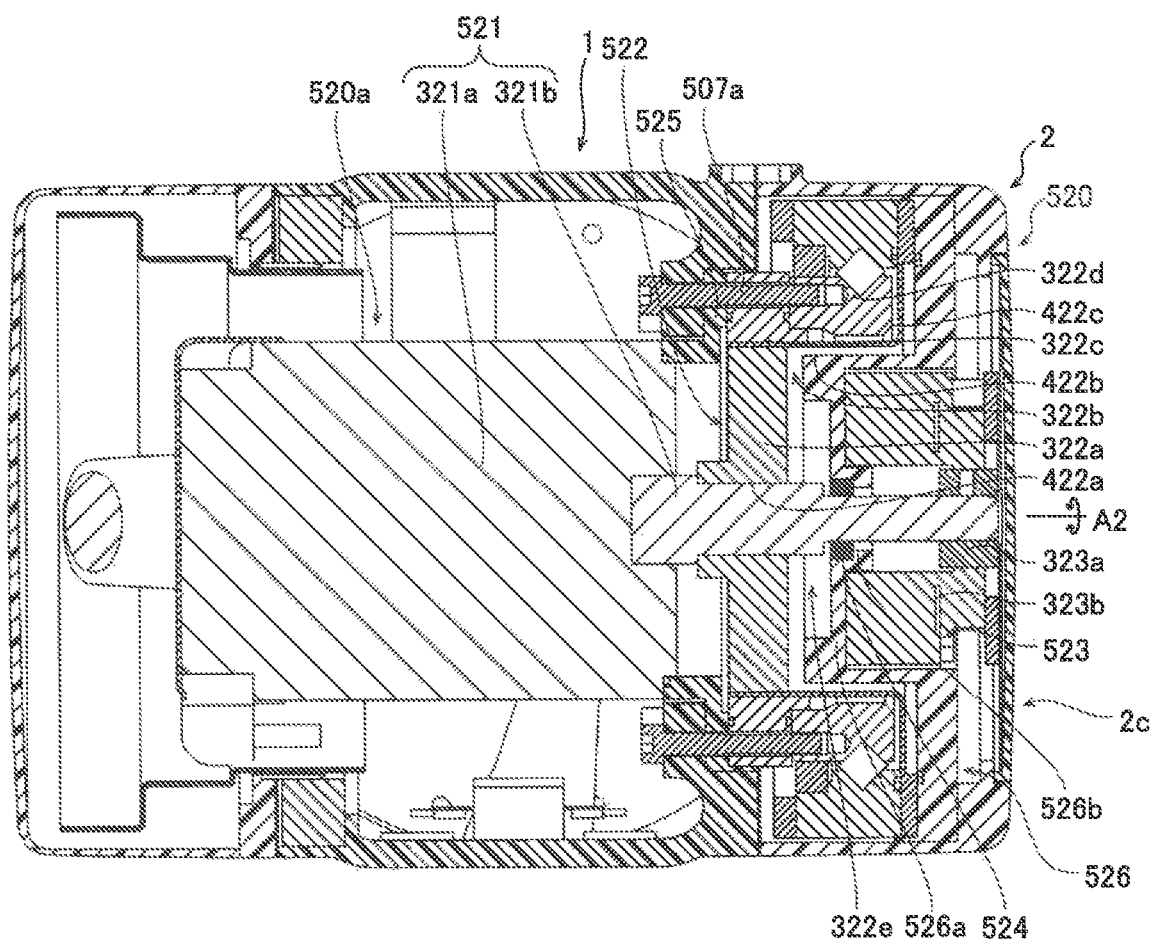
FIG. 15 is a sectional view showing the second joint axis portion of the vertical articulated robot according to the fourth embodiment.

In the fourth embodiment, as shown in FIGS. 14 and 15, the second joint axis portion 520 includes a motor unit 520a integrally including a motor 521, a speed reducer 522, a brake 523, an oil seal 524, and holding members 225 and 526. The motor unit 520a is attachable and detachable while integrally including the motor 521, the speed reducer 522, the brake 523, the oil seal 524, and the holding members 525 and 526.

The motor 521 and the speed reducer 522, the brake 523, and the oil seal 524 have the same or similar configurations as the motor 321, the speed reducer 322, the brake 323, and the oil seal 324 according to the third embodiment, respectively. Therefore, detailed description of the same or similar configurations as those of the third embodiment is omitted, and configurations different from those of the third embodiment are described below.

The motor 521 is attached to the holding member 525 by a fixing tool such as a screw (not shown). The speed reducer 522 is attached to the holding member 525 by a fixing tool such as a screw (not shown). The brake 523 is attached to a brake holder 526a of the holding member 526 by a fixing tool such as a screw (not shown). The oil seal 534 is held by an oil seal holder 526b of the holding member 526. The holding members 525 and 526 integrally hold the motor 521, the speed reducer 522, the brake 523 and the oil seal 524. While integrally including the motor 521, the speed reducer 522, the brake 523, the oil seal 524, and the holding members 525 and 526, the motor unit 520a is attached to a first arm 1 via the holding member 525 by the fixing tool 507a such as a screw, and is attached to a second arm 2 via the holding member 526.

Also in the fourth embodiment, at least a portion (a portion on the X1 direction side) of the brake 523 and the oil seal 524 are arranged inside a recess 322e. That is, at least the portion of the brake 523 and the oil seal 524 are arranged so as to fit inside the recess 322e. At least the portion of the brake 523 and the oil seal 524 overlap the recess 322e (a cylindrical portion 422b of a flexspline 322b and a bearing 322d) as viewed in a direction (such as a Y direction or Z direction) orthogonal to a direction in which a rotation axis A2 extends.

In the fourth embodiment, the brake holder 526a and the oil seal holder 526b of the holding member 526 are arranged inside the recess 322e. That is, the brake holder 526a and the oil seal holder 526b are arranged so as to fit inside the recess 322e. The brake holder 526a and the oil seal holder 526b overlap the recess 322e (the cylindrical portion 422b of the flexspline 322b and the bearing 322d) as viewed in the direction (such as the Y direction or Z direction) orthogonal to the direction in which the rotation axis A2 extends.

Configuration of Third Joint Axis Portion

Figure 16:
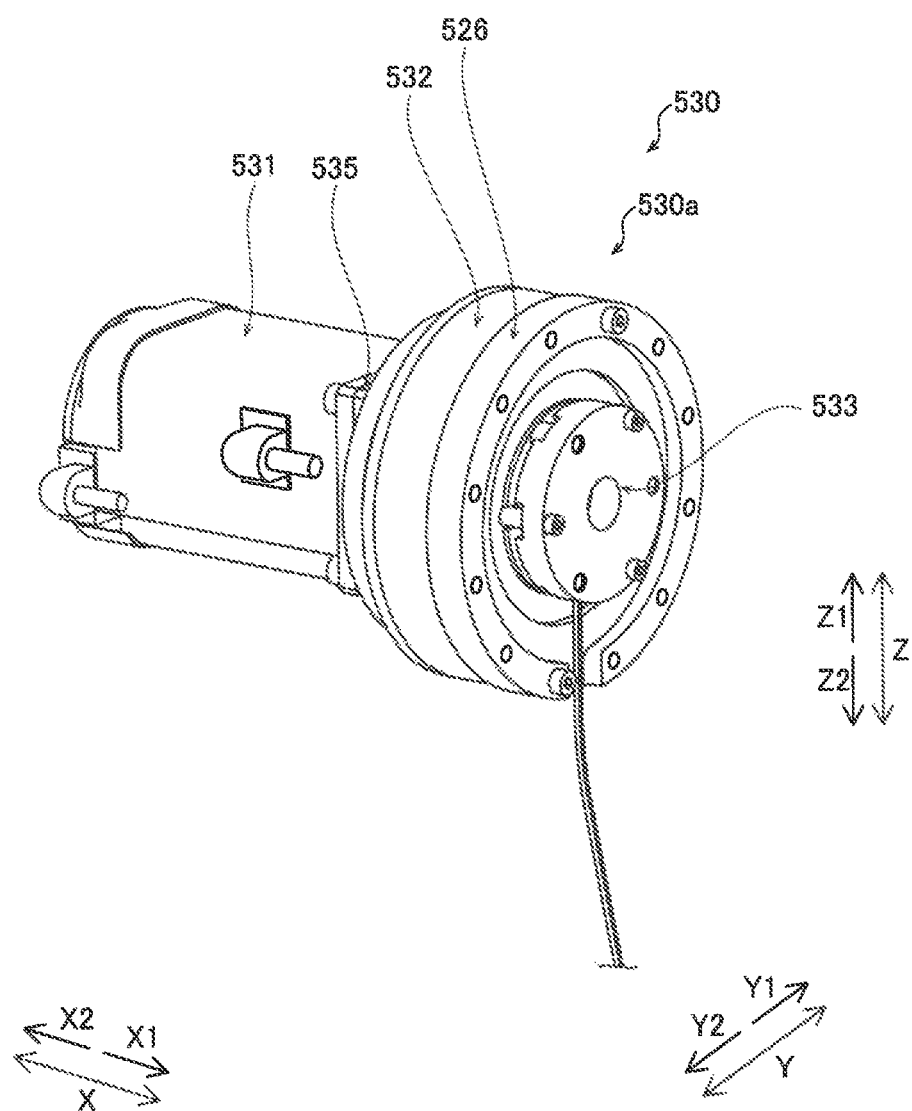
FIG. 16 is a perspective view showing a motor unit of a third joint axis portion of the vertical articulated robot according to the fourth embodiment.
Figure 17:
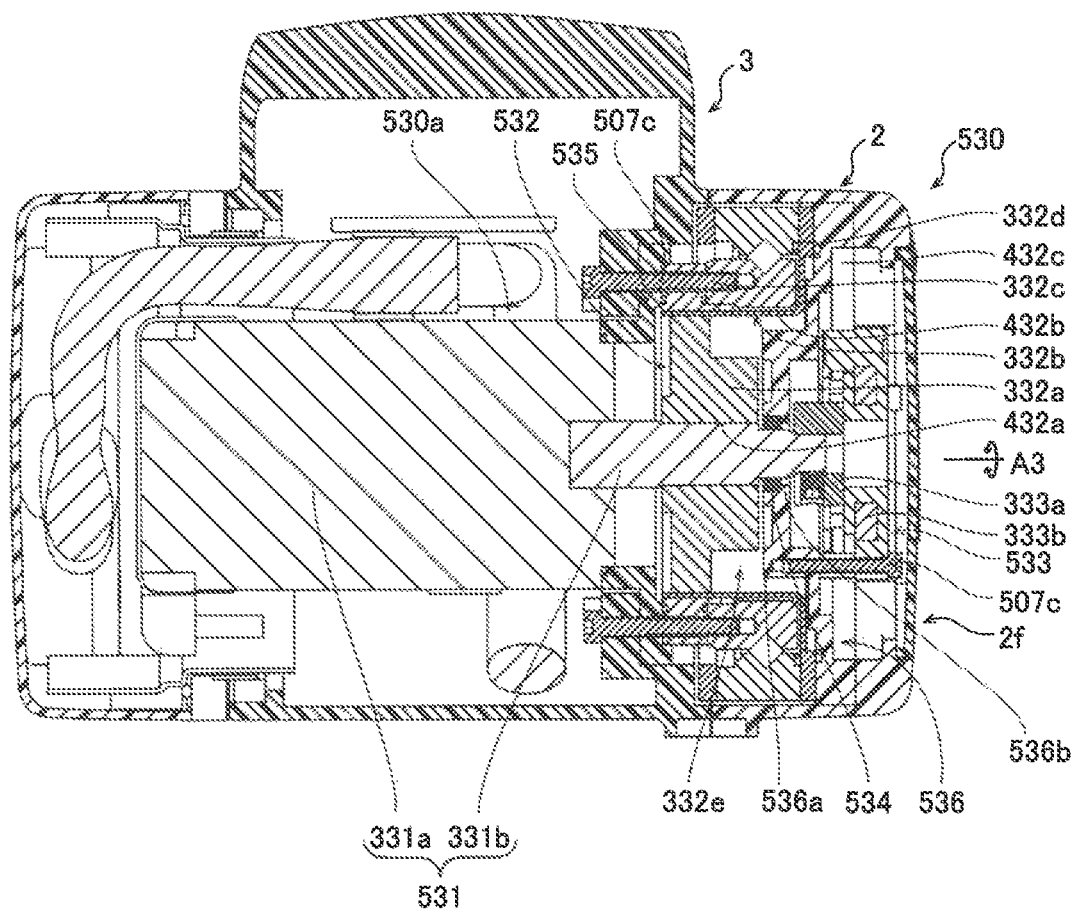
FIG. 17 is a sectional view showing the third joint axis portion of the vertical articulated robot according to the fourth embodiment.
Figure 17:
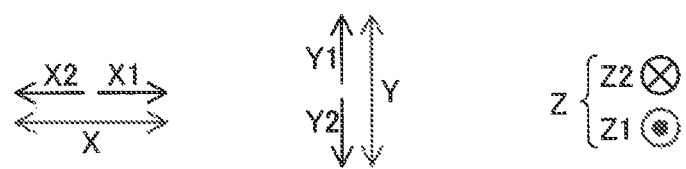

In the fourth embodiment, as shown in FIGS. 16 and 17, the third joint axis portion 530 includes a motor unit 530a integrally including a motor 531, a speed reducer 532, a brake 533, an oil seal 534, and holding members 535 and 536. The motor unit 530a is attachable and detachable while integrally including the motor 531, the speed reducer 532, the brake 533, the oil seal 534, and the holding members 535 and 536.

The motor 531 and the speed reducer 532, the brake 533, and the oil seal 534 have the same or similar configurations as the motor 331, the speed reducer 332, the brake 333, and the oil seal 334 according to the third embodiment, respectively. Therefore, detailed description of the same or similar configurations as those of the third embodiment is omitted, and configurations different from those of the third embodiment are described below.

The motor 531 is attached to the holding member 535 by a fixing tool such as a screw (not shown). The speed reducer 532 is attached to the holding member 535 by a fixing tool such as a screw (not shown). The brake 533 is attached to a brake holder 536a of the holding member 536 by a fixing tool 507b such as a screw (not shown). The oil seal 534 is held by an oil seal holder 536b of the holding member 536. The holding members 535 and 536 integrally hold the motor 531, the speed reducer 532, the brake 533 and the oil seal 534. While integrally including the motor 531, the speed reducer 532, the brake 533, the oil seal 534, and the holding members 535 and 536, the motor unit 530a is attached to a third arm 3 via the holding member 535 by a fixing tool 507c such as a screw, and is attached to the second arm 2 via the holding member 536.

Also in the fourth embodiment, at least a portion (a portion on the X1 direction side) of the brake 533 and the oil seal 534 are arranged inside a recess 332e. That is, at least the portion of the brake 533 and the oil seal 534 are arranged so as to fit inside the recess 332e. At least the portion of the brake 533 and the oil seal 534 overlap the recess 332e (a cylindrical portion 432b of a flexspline 332b and a bearing 332d) as viewed in a direction (such as the Y direction or Z direction) orthogonal to a direction in which a rotation axis A3 extends.

In the fourth embodiment, the brake holder 536a and the oil seal holder 536b of the holding member 536 are arranged inside the recess 332e. That is, the brake holder 536a and the oil seal holder 536b are arranged so as to fit inside the recess 332e. The brake holder 536a and the oil seal holder 536b overlap the recess 332e (the cylindrical portion 432b of the flexspline 332b and the bearing 332d) as viewed in the direction (such as the Y direction or Z direction) orthogonal to the direction in which the rotation axis A3 extends.

The remaining configurations of the fourth embodiment are similar to those of the first embodiment.

Advantageous Effects of Fourth Embodiment

According to the fourth embodiment, the following advantageous effects are achieved.

According to the fourth embodiment, as described above, the joint axis portion 520 (530) is configured similarly to the third embodiment. Accordingly, similarly to the third embodiment, even when the motor 321 (331) and the speed reducer 322 (332) are directly connected to each other, the joint axis portion 520 (530) can be downsized in an axial direction.

According to the fourth embodiment, as described above, the joint axis portion 520 (530) includes the motor unit 520a (530a) integrally including the motor 521 (531), the speed reducer 522 (532), the brake 523 (533), and the oil seal 524 (534). Accordingly, the motor 521 (531), the speed reducer 522 (532), the brake 523 (533), and the oil seal 524 (534) can be handled integrally, and thus the motor 521 (531), the speed reducer 522 (532), the brake 523 (533), and the oil seal 524 (534) can be easily assembled and replaced as compared with a case in which the motor 521 (531), the speed reducer 522 (532), the brake 523 (533), and the oil seal 524 (534) cannot be handled integrally.

The remaining advantageous effects of the fourth embodiment are similar to those of the first embodiment.

Fifth Embodiment

A fifth embodiment is now described with reference to FIG. 18. In this fifth embodiment, an example of a single-axis robot is described unlike the first to fourth embodiments in which an example of the vertical articulated robot is described.

Configuration of Single-Axis Robot

Figure 18:
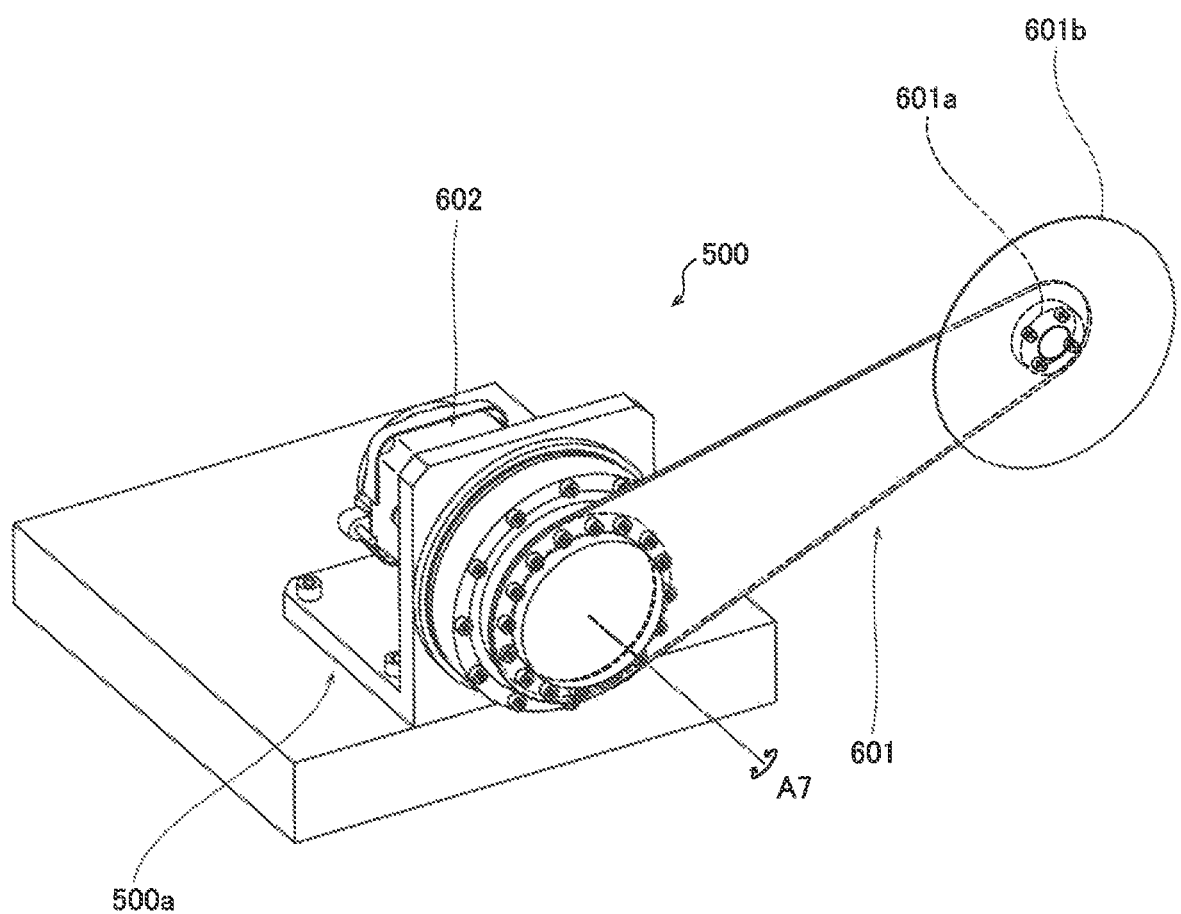
FIG. 18 is a perspective view showing the overall configuration of a single-axis robot according to a fifth embodiment.

As shown in FIG. 18, a single-axis robot 500 according to the fifth embodiment is a robot that takes out an injection-molded disk 601b having one degree of freedom from an injection molding machine. The single-axis robot 500 is installed on an installation surface such as a floor via a base 500a.

The single-axis robot 500 includes an arm 601 and a rotation axis portion 602 that rotationally drives the arm 601. The rotation axis portion 602 rotationally drives the arm 601 around a rotation axis A7 extending along a width direction (horizontal direction) orthogonal to a direction in which the arm 601 extends. A suction pad 601a is provided at the distal end of the arm 601. The arm 601 suctions the disk 601b, which is an injection-molded product, by the suction pad 601 at the distal end.

Although detailed description is omitted, the rotation axis portion 602 has the same or similar configuration as the motor unit 220a of the second joint axis portion 220 according to the second embodiment. That is, the rotation axis portion 602 has the structure shown in FIGS. 5 and 6. The rotation axis portion 602 may have the same or similar configuration as the motor unit 520a of the second joint axis portion 520 according to the fourth embodiment. Similarly, the rotation axis portion 602 may have the same or similar configuration as the motor unit 230a of the third joint axis portion 230 according to the second embodiment or the motor unit 530a of the third joint axis portion 530 according to the fourth embodiment.

The remaining configurations of the fifth embodiment are similar to those of the first embodiment.

Advantageous Effects of Fifth Embodiment

According to the fifth embodiment, the following advantageous effects are achieved.

According to the fifth embodiment, as described above, the rotation axis portion 602 is configured similarly to the motor unit 220a of the second joint axis portion 220 according to the second embodiment. Accordingly, similarly to the second embodiment, the rotation axis portion 602 can be downsized in an axial direction while a decrease in the positioning accuracy due to stretching of a timing belt is prevented.

The remaining advantageous effects of the fifth embodiment are similar to those of the first embodiment.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the vertical articulated robot is a six-axis robot having six degrees of freedom has been shown in each of the aforementioned first to fourth embodiments, the present disclosure is not restricted to this. In the present disclosure, the vertical articulated robot may be a robot having five or less degrees of freedom, or a robot having seven or more degrees of freedom.

While the example in which both at least the portion of the brake and the oil seal are arranged inside the recess has been shown in each of the aforementioned first to fourth embodiments, the present disclosure is not restricted to this. In the present disclosure, only one of at least the portion of the brake and the oil seal may be arranged inside the recess.

While the example in which the narrow joint axis portion according to the present disclosure is the second joint axis portion, the third joint axis portion, or the fifth joint axis portion that rotationally drives the arm around the rotation axis extending along the width direction orthogonal to the direction in which the arm extends has been shown in each of the aforementioned first to fourth embodiments, the present disclosure is not restricted to this. In the present disclosure, the narrow joint axis portion may be a joint axis portion (such as the fourth joint axis portion according to each of the first to fourth embodiments) that rotationally drives an arm around a rotation axis extending along a direction in which the arm extends.

While the example in which all of the joint axis portions (the second joint axis portion, the third joint axis portion, and the fifth joint axis portion) that rotationally drive the arm around the rotation axis extending along the width direction orthogonal to the direction in which the arm extends are the narrow joint axis portions according to the present disclosure has been shown in each of the aforementioned first to fourth embodiments, the present disclosure is not restricted to this. In the present disclosure, when there are a plurality of joint axis portions that rotationally drive the arm around the rotation axis extending along the width direction orthogonal to the direction in which the arm extends, only one or some of the plurality of joint axis portions may be the narrow joint axis portions according to the present disclosure.

While the example in which the speed reducer is a wave gear speed reducer has been shown in each of the aforementioned first to fourth embodiments, the present disclosure is not restricted to this. In the present disclosure, as long as the speed reducer includes a recess that is recessed along the rotation axis direction, the speed reducer may be a speed reducer other than the wave gear speed reducer.

While the example in which the speed reducers of the second joint axis portion and the third joint axis portion each include the recess on the side opposite to the motor side has been shown in each of the aforementioned third and fourth embodiments, the present disclosure is not restricted to this. In the present disclosure, the speed reducer of the fifth joint axis portion corresponding to the wrist structure may include a recess on the side opposite to the motor side.

What is claimed is:

1. A vertical articulated robot comprising:
a plurality of arms; and
a plurality of joint axis portions configured to rotationally drive the plurality of arms; wherein
the plurality of joint axis portions include a predetermined joint axis portion;
the predetermined joint axis portion includes:
a motor including a motor shaft having a motor shaft rotation axis;
a speed reducer directly connected to the motor shaft;
a brake configured to hold the motor; and
an oil seal mounted on the motor shaft;
the speed reducer of the predetermined joint axis portion includes a recess defined by at least a shaft input and a bearing and recessed along a rotation axis direction of the motor shaft rotation axis;
in the predetermined joint axis portion, at least a portion of the brake and the oil seal are arranged inside the recess;
an entirety of the brake and an entirety of the oil seal are disposed closer to the motor shaft rotation axis than an outer periphery of the shaft input in a radial direction orthogonal to the rotation axis direction;
the speed reducer includes a wave gear speed reducer;
the wave gear speed reducer includes a wave generator as the shaft input, a circular spline, and a flexspline; and
at least the portion of the brake and the oil seal are arranged inside the recess defined by at least the wave generator, the circular spline, the flexspline, and the bearing.

2. The vertical articulated robot according to claim 1, wherein
the predetermined joint axis portion includes a joint axis portion configured to rotationally drive the arm around a rotation axis extending along a width direction orthogonal to a direction in which the arm extends.

3. The vertical articulated robot according to claim 2, wherein
the predetermined joint axis portion includes a wrist structure joint axis portion on a distal side.

4. The vertical articulated robot according claim 2, wherein
the predetermined joint axis portion includes a motor unit integrally including the motor, the speed reducer, the brake, and the oil seal.

5. The vertical articulated robot according to claim 2, wherein
the plurality of joint axis portions include a distal joint axis portion configured to attach to a tool; and
the predetermined joint axis portion and the distal joint axis portion are configured to integrally form a distal joint axis portion unit.

6. The vertical articulated robot according claim 1, wherein
the predetermined joint axis portion includes a motor unit integrally including the motor, the speed reducer, the brake, and the oil seal.

7. The vertical articulated robot according to claim 1, wherein
the plurality of joint axis portions include a distal joint axis portion configured to attach to a tool; and
the predetermined joint axis portion and the distal joint axis portion are configured to integrally form a distal joint axis portion unit.

8. A vertical articulated robot according to claim 2, comprising:
a plurality of arms; and
a plurality of joint axis portions configured to rotationally drive the plurality of arms; wherein
the plurality of joint axis portions include a predetermined joint axis portion;
the predetermined joint axis portion includes:
a motor including a motor shaft having a motor shaft rotation axis;
a speed reducer directly connected to the motor shaft;
a brake configured to hold the motor; and
an oil seal mounted on the motor shaft;
the speed reducer of the predetermined joint axis portion includes a recess defined by at least a shaft input and a bearing and recessed along a rotation axis direction of the motor shaft rotation axis;
in the predetermined joint axis portion, at least a portion of the brake and the oil seal are arranged inside the recess;
an entirety of the brake and an entirety of the oil seal are disposed closer to the motor shaft rotation axis than an outer periphery of the shaft input in a radial direction orthogonal to the rotation axis direction;

the predetermined joint axis portion includes a joint axis portion configured to rotationally drive the arm around a rotation axis extending along a width direction orthogonal to a direction in which the arm extends;

the speed reducer includes a wave gear speed reducer;

the wave gear speed reducer includes a wave generator as the shaft input, a circular spline, and a flexspline; and at least the portion of the brake and the oil seal are arranged inside the recess defined by at least the wave generator, the circular spline, the flexspline, and the bearing.

9. A vertical articulated robot comprising:

a plurality of arms; and a plurality of joint axis portions configured to rotationally drive the plurality of arms; wherein the plurality of joint axis portions include a predetermined joint axis portion;

the predetermined joint axis portion includes:
- a motor including a motor shaft having a motor shaft rotation axis;
- a speed reducer directly connected to the motor shaft;
- a brake configured to hold the motor; and
- an oil seal mounted on the motor shaft;

the speed reducer of the predetermined joint axis portion includes a recess defined by at least a shaft input and a bearing and recessed along a rotation axis direction of the motor shaft rotation axis;

in the predetermined joint axis portion, at least a portion of the brake and the oil seal are arranged inside the recess;

an entirety of the brake and an entirety of the oil seal are disposed closer to the motor shaft rotation axis than an outer periphery of the shaft input in a radial direction orthogonal to the rotation axis direction;

the predetermined joint axis portion includes a joint axis portion configured to rotationally drive the arm around a rotation axis extending along a width direction orthogonal to a direction in which the arm extends;

the predetermined joint axis portion includes a wrist structure joint axis portion on a distal side;

the speed reducer includes a wave gear speed reducer;

the wave gear speed reducer includes a wave generator as the shaft input, a circular spline, and a flexspline; and at least the portion of the brake and the oil seal are arranged inside the recess defined by at least the wave generator, the circular spline, the flexspline, and the bearing.

\* \* \* \* \*